US010139000B2

(12) United States Patent
Hattori et al.

(10) Patent No.: US 10,139,000 B2
(45) Date of Patent: Nov. 27, 2018

(54) HYDRAULIC CONTROL SYSTEM FOR A BELT-DRIVEN CONTINUOUSLY VARIABLE TRANSMISSION

(71) Applicant: TOYOTA JIDOSHA KABUSHIKI KAISHA, Toyota-shi (JP)

(72) Inventors: Yuji Hattori, Toyota (JP); Kenta Kimura, Toyota (JP); Takafumi Inagaki, Toyota (JP); Yuu Nagasato, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 454 days.

(21) Appl. No.: 14/780,903

(22) PCT Filed: Apr. 9, 2013

(86) PCT No.: PCT/JP2013/060739
§ 371 (c)(1),
(2) Date: Sep. 28, 2015

(87) PCT Pub. No.: WO2014/167651
PCT Pub. Date: Oct. 16, 2014

(65) Prior Publication Data
US 2016/0061320 A1    Mar. 3, 2016

(51) Int. Cl.
*F16H 61/662* (2006.01)
*F16H 61/02* (2006.01)
(Continued)

(52) U.S. Cl.
CPC ............ *F16H 61/662* (2013.01); *F16H 9/12* (2013.01); *F16H 61/02* (2013.01);
(Continued)

(58) Field of Classification Search
CPC ............ F16H 61/662; F16H 61/66259; F16H 61/66272; F16H 61/0265; F16H 61/0204;
(Continued)

(56) References Cited

FOREIGN PATENT DOCUMENTS

| JP | 2011-163508 A | 8/2011 |
|---|---|---|
| JP | 2012-102765 A | 5/2012 |

OTHER PUBLICATIONS

International Search Report dated May 21, 2013, in PCT/JP2013/060739 filed Apr. 9, 2013.

*Primary Examiner* — Erin D Bishop
(74) *Attorney, Agent, or Firm* — Oblon, McClelland, Maier & Neustadt, L.L.P.

(57) ABSTRACT

A hydraulic control system stably controls pressure in a hydraulic chamber of a pulley accommodating a belt by controlling a feeding valve and a discharging valve. The control system reduces a control amount of the feeding valve to be smaller than that calculated based on a pressure difference in a case other than one in which pressure in the hydraulic chamber is increased by delivering oil to another chamber, in case the pressure in the hydraulic chamber is increased by delivering the oil to the other chamber. The control system reduces a control amount of the discharging valve to be smaller than that calculated based on the pressure difference in a case other than one in which pressure in the hydraulic chamber is lowered by discharging the oil from the other chamber, in case the pressure in the hydraulic chamber is lowered by discharging the oil to the other chamber.

17 Claims, 18 Drawing Sheets

(51) Int. Cl.
*F16H 9/12* (2006.01)
*F16H 61/00* (2006.01)
(52) U.S. Cl.
CPC ..... *F16H 61/0265* (2013.01); *F16H 61/0276* (2013.01); *F16H 61/66259* (2013.01); *F16H 61/66272* (2013.01); *F16H 2061/0078* (2013.01)
(58) Field of Classification Search
CPC ....... F16H 61/0276; F16H 2061/66277; F16H 2061/0078
See application file for complete search history.

HYDRAULIC CONTROL SYSTEM FOR A BELT-DRIVEN CONTINUOUSLY VARIABLE TRANSMISSION

TECHNICAL FIELD

The present invention relates generally to a hydraulic control system for a transmission in which a speed ratio and a torque transmitting capacity are controlled hydraulically, and especially to a hydraulic control system for a belt-driven continuously variable transmission in which a speed ratio is changed continuously by changing widths of belt grooves formed in a pair of pulleys.

BACKGROUND ART

A speed ratio of a transmission is changed by altering a torque transmission route and a torque transmitting point. In the transmission in which a frictional engagement device is arranged on the torque transmission route, the torque transmitting capacity of the transmission is governed by an engagement force. One example of the conventional transmission in which the speed ratio and the torque transmitting capacity are thus controlled is described in Japanese Patent Laid-Open No. 2011-163508.

Specifically, Japanese Patent Laid-Open No. 2011-163508 describes a belt-driven continuously variable transmission comprising a drive pulley (i.e., a primary pulley), a driven pulley (i.e., a secondary pulley) and a belt running between those pulleys. Each pulley comprises a fixed sheave and a movable sheave that reciprocate with respect to the fixed sheave to change a width of a belt groove formed therebetween. Each primary pulley and the secondary pulley is individually provided with a hydraulic chamber for establishing a thrust force applied to the movable sheave. Each hydraulic chamber is connected to a feeding valve for delivering oil thereto from a hydraulic source, and to a discharging valve for draining the oil to a drain site. A groove width of one of the pulleys (i.e., the primary pulley) is narrowed to increase a running diameter of the belt to cause an upshifting by opening the feeding valve connected thereto to deliver the oil thereto. By contrast, the groove width of the primary pulley is widened to decrease the running diameter of the belt to cause a downshifting by opening the discharging valve connected thereto to discharge the oil therefrom. On the other hand, a belt clamping pressure of the other pulley (i.e., the secondary pulley) is increased to increase a torque transmitting capacity by opening the feeding valve connected thereto to deliver the oil thereto. By contrast, the belt clamping pressure of the secondary pulley is reduced to reduce the torque transmitting capacity by opening the discharging valve connected thereto to discharge the oil therefrom.

According to the teachings of Japanese Patent Laid-Open No. 2011-163508, a balance piston solenoid valve is used as the feeding valve and the discharging valve. In the solenoid valve, a piston integrated with a needle-shaped or shaft-shaped valve element is held in a cylinder while being allowed to reciprocate in an axial direction. An inlet port and an outlet port are formed in the chamber holding the piston, and the inlet port is connected to a high pressure site and the outlet port is connected to a low pressure site. The solenoid valve is closed by pushing the valve element onto an opening end of the hydraulic chamber side of the outlet port. The hydraulic chamber is connected to an opposite chamber (as will be tentatively called the "control chamber") across the piston through a communication passage on which an orifice is formed. The control chamber is also connected to the low pressure site and a solenoid is arranged in the control chamber to selectively provide a communication between the control chamber and the low pressure site. Specifically, pressure in the control chamber is lowered by opening the solenoid so that the piston is withdrawn from a valve seat toward the control chamber to open the valve. By contrast, pressure in the control chamber is raised by closing the solenoid so that the piston is pushed onto the valve seat to close the outlet port thereby closing the valve.

The feeding valve and the discharging valve taught by Japanese Patent Laid-Open No. 2011-163508 is opened by applying a current thereto, and an opening degree thereof is changed according to the current value. However, those valves do not have a function to control a pressure, and hence a speed ratio and a belt clamping pressure (i.e., a torque transmitting capacity) are controlled by controlling the feeding valve and the discharging valve by a feedback method. To this end, for example, a pressure difference in the hydraulic chamber of the drive pulley is calculated based on a difference between a target speed ratio and an actual speed ratio, and a control amount of the feeding valve or the discharging valve is calculated based on the pressure difference and a control gain. Likewise, in order to control pressure in the secondary pulley, a control amount of the feeding valve or the discharging valve is calculated based on a pressure difference between a target pressure determined based on a drive demand such as an accelerator opening and an actual pressure, and the feeding valve or the discharging valve is controlled based on the control amount thus calculated.

In general, a speed ratio of the belt-driven continuously variable transmission is calculates as a ratio between rotational speeds of the drive pulley and the drivel pulley, however, the rotational speeds of those pulleys are slightly changed during propulsion of the vehicle by a various kinds of factors. Likewise, the pressure in the hydraulic chamber of the secondary pulley, that is, the belt clamping pressure is also changed slightly by changes in the rotational speed, an initial pressure and so on. This means that the oil is always delivered or discharged to/from the hydraulic chamber of each pulley. For example, if the pressure in the hydraulic chamber of the primary pulley is changed, a clearance between the fixed sheave and the movable sheave thereof, that is, the running diameter of the belt is changed. Consequently, in the secondary pulley, a groove width is widened or narrowed in response to a change in the running diameter of the belt running therein. That is, pressure in the hydraulic chamber of the secondary pulley is raised or lowered by an axial movement of the movable sheave. As a result, the feeding valve or the discharging valve connected to the hydraulic chamber is opened or closed to adjust the pressure in the hydraulic chamber to the target pressure.

Thus, in the belt-driven continuously variable transmission, pressure change in the hydraulic chamber of the drive pulley exerts influence to the pressure in the hydraulic chamber of the secondary pulley. Likewise, when the pressure in the hydraulic chamber of the secondary pulley is increased or lowered to control the belt clamping pressure, the pressure in the hydraulic chamber of the drive pulley is changed by such pressure change. That is, if the hydraulic pressure is changed not only to control the speed ratio but also to control the belt clamping pressure simultaneously, the hydraulic pressure may be changed excessively to cause a pressure hunting. Such disadvantage may also be caused in the system in which the feeding valve and the discharging valve are not the above-explained balance piston valve. FIG.

21 shows a situation in which the pressure in the hydraulic chamber of the secondary pulley is changed significantly by executing an upshifting under conditions that a downshifting is slightly in execution while maintaining the pressure in the hydraulic chamber of the secondary pulley to a constant level to maintain the belt clamping pressure to a constant level. During the upshifting, the pressure in the hydraulic chamber is increased to widen a groove width in the primary pulley and hence the groove width in the secondary pulley is widened compulsory. Consequently, the pressure in the hydraulic chamber of the secondary pulley may be raised by a reduction in the capacity thereof, and in addition, the oil may be delivered thereto to control the belt clamping pressure. For these reasons, as shown in FIG. 21, the pressure in the hydraulic chamber of the secondary pulley may be fluctuated significantly to cause the hunting after commencement of the upshifting.

DISCLOSURE OF THE INVENTION

The present invention has been conceived noting the foregoing technical problem, and it is therefore an object of the present invention is to improve a control stability of a hydraulic control system configured to control hydraulic pressure in a hydraulic chamber of a pulley holding a belt therein by a valve.

In the hydraulic control system, a belt-driven continuously variable transmission, comprises: a pair of pulleys; a belt running between the pulleys; and a hydraulic chamber formed on each pulley that increases a thrust force in a direction to narrow a belt groove of the pulley in accordance with an increase in a hydraulic pressure applied thereto. Pressure in one of the hydraulic chambers is increased by delivering oil to the other pulley, and pressure in the other pulley is lowered by discharging the oil from said one of the pulleys. A feeding valve that is opened to deliver the oil to the hydraulic chamber and a discharging valve that is opened to discharge the oil from the hydraulic chamber are individually connected to the hydraulic chambers. The hydraulic control system is configured to execute a feedback control of the feeding valve and the discharging valve in such a manner to adjust pressure in the hydraulic chamber to a target level based on a difference between the target pressure and an actual pressure in the hydraulic chamber. In order to achieve the above-explained objective, according to the present invention, the hydraulic control system is configured to carry out a control to: reduce a control amount of the feeding valve connected to said one of the hydraulic chambers to be smaller than that calculated based on the pressure difference in a case other than the case in which the pressure in said one of the hydraulic chambers is increased by delivering the oil to the other chamber, in case the pressure in said one of the hydraulic chambers is increased by delivering the oil to the other chamber; and reduce a control amount of the discharging valve connected to said one of the hydraulic chambers to be smaller than that calculated based on the pressure difference in a case other than the case in which the pressure in said one of the hydraulic chambers is lowered by discharging the oil from the other chamber, in case the pressure in said one of the hydraulic chambers is lowered by discharging the oil to the other chamber.

The control to reduce the control amount may include a control to reduce a predetermined control gain.

Specifically, the control gain includes: a control gain that is increased in case an oil temperature is high, to be larger than that of a case in which the oil temperature is low; and a control gain that is increased in case a feeding pressure to the feeding valve or the discharging valve is high, to be larger than that of a case in which the feeding pressure is low.

The control to reduce the control amount may further include a control to reduce the control amount calculated based on said difference to zero.

Specifically, said one of the hydraulic chambers is formed on one of the pulleys to which the oil is delivered thereto and discharged therefrom to control a belt clamping pressure, and the other hydraulic chamber is formed on the other pulley to which the oil is delivered thereto and discharged therefrom to change a speed ratio. In addition, the hydraulic control system is further configured to inhibit the control to reduce the control amount of the feeding valve or the discharging valve connected to said one of the hydraulic chambers, in case an amount of change in the speed ratio within a predetermined period of time falls within a predetermined range.

The hydraulic control system is further configured to change the control amount at a predetermined rate, in case of reducing the control amount or in case of increasing the reduced control amount when the control to reduce the control amount is terminated.

At least any one of the feeding valve and the discharging valve may be a balance piston valve comprising: a cylinder holding a piston in such a manner that the piston is allowed to reciprocate; a first chamber and a second chamber defined in an internal space of the cylinder by the piston; a control orifice providing a communication between the first chamber and the second chamber; an inlet port formed in the first chamber to provide a communication between the first chamber and a predetermined high pressure site; an outlet port in the first chamber to provide a communication between the first chamber and a predetermined low pressure site; a valve element integrated with the piston to open and close any of the inlet port and the outlet port; and a solenoid valve selectively providing a communication between the second chamber and the low pressure site.

The hydraulic control system may be configured to reduce an effect of oil viscosity. In this case, solenoid valve may be adapted to change an opening degree thereof in accordance with the control amount, and to create an orifice when it is opened that increases an increment of flow resistance increased by an increase in oil viscosity, to be larger than an increment of flow resistance of the oil flowing through the control orifice. In addition, the hydraulic control system comprises a control amount setting means that increases a control amount of the solenoid valve in such a manner that an opening degree of the solenoid valve of a case in which an oil temperature is at a predetermined value is increased to be larger than that of a case in which the oil temperature is higher than the predetermined value.

The solenoid valve may include a valve in which an opening degree thereof is increased with an increase in the control amount. In addition, the control amount setting means may include a means that increases the control amount of the solenoid valve in case the oil temperature is at the predetermined value, to be larger than that of the case in which the oil temperature is higher than the predetermined value.

Alternatively, the solenoid valve in which an opening degree thereof is reduced with an increase in the control amount may also be used. In this case, the control amount setting means reduces the control amount of the solenoid valve in case the oil temperature is at the predetermined value, to be smaller than that of the case in which the oil temperature is higher than the predetermined value.

According to the present invention, the balance piston valve may be adapted to reduce an impact of a change in oil viscosity. To this end, the solenoid valve may be adapted to be opened by axially pushing a valve element by an electromagnetic force onto an opening of a port connected to the second chamber, and to be opened by withdrawing the valve element from the opening of the port to create a clearance for allowing the oil to flow therethrough. In this case, an adjuster portion is formed in a communication passage in such a manner that in such a manner that a relation between a flow rate and a temperature of the oil flowing through the communication passage is approximated to a relation between a flow rate and a temperature of the oil flowing through the opened solenoid valve between the valve element and the opening of the port.

An adjuster portion may be an oil hole in which an opening diameter thereof is smaller than a cross-sectional area of the communication passage and a length thereof is longer than the opening diameter thereof.

In addition, the hydraulic control system may be configured to reduce an impact of a change in a feeding pressure. To this end, the solenoid valve may be adapted to change an opening degree thereof in accordance with the control amount. In addition, the control amount setting means may be configured to reduce a control amount of the solenoid valve in such a manner that an opening degree of the solenoid valve of a case in which the pressure applied to the first chamber is higher than a predetermined level, to be larger than that of a case in which the pressure applied to the first chamber is lower than the predetermined level.

In this case, the solenoid valve is controlled by the feedback method based on a difference between a target pressure and an actual pressure in the hydraulic chamber. In addition, the control amount setting means serves as: a means that reduces a feedback control gain of the solenoid valve; a means that reduces the difference between the target pressure and a detected actual pressure in the hydraulic chamber; and a means that corrects the control amount calculated based on the difference between the target pressure and the detected actual pressure in the hydraulic chamber.

The hydraulic control system may further comprise: a guard setting means that sets a limit value of stroke of the valve element in a direction to open the valve based on a difference between a target pressure and an actual pressure in the hydraulic chamber; and a restriction means that restricts the control amount of the solenoid valve to reduce the stroke of the valve element to be smaller than the limit value.

In this case, the valve element may be adapted to move in the direction to open the valve by applying a current to the solenoid valve. In addition, the hydraulic control system may further comprise a stroke calculation means that calculates the stroke of the valve element based on a command value and a command time of the current applied to the solenoid valve.

The stroke calculation means may also be configured to calculate the stroke of the valve element based on an amount of change in the pressure in the hydraulic chamber.

According to the hydraulic control system, a belt clamping pressure of the transmission is controlled by controlling a hydraulic pressure applied to the hydraulic chamber of one of the pulleys, and a speed ratio of the transmission is controlled by controlling the belt groove of the pulley by applying a predetermined pressure to the hydraulic chamber of the other pulley. Consequently, belt is clamped by the pulley by a contact pressure to achieve a desired torque transmitting capacity. The pressures in the hydraulic chambers are controlled by selectively opening and closing the feeding valve or the discharging valve connected thereto. To this end, specifically, the feeding valve and the discharging valve are controlled by the feedback method based on the difference between the target pressure and the actual pressure in the hydraulic chamber. When the pressure in one of the hydraulic chamber is increased by delivering the oil to the other hydraulic chamber, a control amount of the feeding valve for delivering the oil to said one of the hydraulic chamber is reduced to be smaller than that in different situation. Specifically, the control amount is calculated based on the aforementioned difference, and in this case, the control amount thus calculated is reduced to zero. Alternatively, the control amount may also be reduced by reducing the control gain to be smaller than the predetermine value. In the hydraulic control system according of the present invention, therefore, the pressure in said one of the hydraulic chambers will not be raised by an increment of the pressure in the other hydraulic chamber and the oil delivered thereto via the feeding valve simultaneously. For this reason, hydraulic pressure can be controlled in a stable manner while avoiding overshooting and hunting.

By contrast, in case the pressure in one of the hydraulic chamber is decreased by discharging the oil from the other hydraulic chamber, a control amount of the discharging valve for discharging the oil from said one of the hydraulic chamber is reduced to be smaller than that in different situation. Specifically, the control amount calculated based on the aforementioned difference is reduced to zero. Alternatively, the control amount may also be reduced by reducing the control gain to be smaller than the predetermine value. In the hydraulic control system according of the present invention, therefore, the pressure in said one of the hydraulic chambers will not be lowered by a pressure drop in the other hydraulic chamber and by discharging the oil therefrom via the discharging valve simultaneously. For this reason, hydraulic pressure can be controlled in a stable manner while avoiding overshooting and hunting.

Since the control gain is changed in accordance with the oil pressure or the feeding pressure, the hydraulic control accuracy will not be deteriorated by the oil viscosity and the feeding pressure.

As described, the hydraulic control system according to the present invention is configured to inhibit the control to reduce the control amount of the valve in case an amount of change in the speed ratio within a predetermined period of time falls within a predetermined range. In case an amount of change in the speed ratio within a predetermined period of time, that is, a speed change rate is small, pressure in one of the hydraulic chamber will not be influenced significantly by a change in the pressure in the other hydraulic chamber. In this case, delivery and drainage of the oil to/from the hydraulic chamber have to be carried out sensitively in response to a slight change in the hydraulic pressure. However, the control amount of the valve will not be reduced under the condition that the speed change rate is small so that the hydraulic pressure can be controlled in a stable manner.

Thus, according to the present invention, the control to reduce the control amount of the feeding valve or the discharging valve is reduced under the above-explained specific conditions. That is, the control amount of the valve is reduced or returned to the initial value upon satisfaction or dissatisfaction of such specific condition, but the control amount of the valve is changed at the predetermined rate. Therefore, the control hunting can be avoided when changing the control amount of the valve so that the hydraulic pressure can be controlled in a stable manner.

As also described, according to the present invention, the balance piston valve may be used as the feeding valve and the discharging valve to downsize the solenoid valve. In this case, hydraulic pressure may also be controlled in a stable manner.

The hydraulic control system of the present invention may also be configured to increase the control amount of the solenoid valve to open widely in case the oil viscosity is increased. Therefore, a flow rate of the oil flowing through the orifice created by opening the solenoid valve can be maintained to a level of a case in which the oil viscosity is low. For this reason, the flow rate of the oil flowing through the orifice created by opening the solenoid valve can be ensured as much as that of the oil flowing through the control orifice even when the oil viscosity is increased. That is, the relation between the control amount of the solenoid valve and an opening degree of the balance piston valve or the flow rate of the oil flowing therethrough will not be varied by a change in the oil viscosity. According to the present invention, therefore, controllability of the transmission will not be deteriorated by a change in the viscosity or temperature of the oil.

In the hydraulic control system of the present invention, the balance piston valve is opened by moving the piston by a pressure difference between the first chamber and the second chamber. Specifically, such pressure difference is established by a difference between the flow rate of the oil flowing through the clearance created between the valve element and the port (serving as the orifice) when the solenoid valve is opened, and the flow rate of the oil flowing through the adjuster portion formed in the communication passage. The flow resistance of the oil flowing through the orifice created by opening the solenoid valve is increased with a reduction in the oil temperature. However, the relation between the flow rate and the temperature of the oil flowing through the communication passage is equalized or approximated to the relation between the flow rate and the temperature of the oil flowing through the clearance created opening the solenoid valve by the adjuster portion formed in the communication passage. For this reason, the relation between an amount of the oil discharged from the second chamber when the solenoid valve is opened and an amount of the oil delivered to the second chamber through the communication passage will not be changed by a change in the oil viscosity resulting from a change in the oil temperature. Thus, according to the hydraulic control system of the present invention, the hydraulic control will not be influenced by reduction in the oil temperature and a resultant increment of the oil viscosity so that the controllability of the transmission can be improved.

The hydraulic control system of the present invention may also be configured to reduce the control amount of the solenoid valve to reduce the opening degree thereof in case the feeding pressure to the first chamber is higher than the predetermined level, in comparison with the case in which the feeding pressure to the first chamber is low. Therefore, even if the feeding pressure is increased, the control amount of the solenoid valve is reduced to reduce the discharging amount from the second chamber so that the pressure difference between the first chamber and the second chamber will not be widened. That is, delivery and discharge of the oil to/from the hydraulic chamber will not be influenced by the rise in the feeding pressure so that the hydraulic pressure can be controlled in a stable manner.

According to the hydraulic control system of the present invention, the second chamber is connected to the low pressure site by energizing the solenoid valve of the balance piston valve to open the solenoid valve. Consequently, the oil is discharged from the second chamber, and in this situation, oil delivery to the second chamber is restricted by the control orifice so that the pressures in the first chamber and the second chamber are differentiated. As a result, the thrust force pushing the piston and the valve element integrated therewith in the direction to open the valve exceeds the thrust force in the counter direction to close the valve, and hence the valve element is withdrawn toward the second chamber to open the valve. In this case, the control amount of the solenoid valve being withdrawn is restricted in such a manner that the stroke of the valve element will not exceed the guard value. Specifically, such guard value is set on the basis of the pressure difference between the target pressure and the actual pressure in the hydraulic chamber under control. Therefore, the solenoid valve will not be opened excessively by such withdrawal of the valve element with respect to the pressure difference. For this reason, the actual pressure in the hydraulic chamber will not be raised or lowered excessively with respect to the target pressure. Thus, the valve element is reciprocated depending on the pressure difference between the chambers formed across the piston. According to the hydraulic control system of the present invention, a position of the piston is not especially controlled but the stroke of the valve element is restricted by the guard value. Therefore, the hydraulic pressure can be controlled in a stable manner even in case of withdrawing the valve element slightly within the stroke range thus restricted, that is, even if a desired flow rate is small.

Optionally, the stroke of the valve element may be calculated based on the command value and the command time of the current applied to the solenoid valve. In this case, the hydraulic pressure can be controlled without using a sensing device such as a stroke sensor.

In addition, the stroke of the valve element can be estimated accurately based on the pressure in the hydraulic chamber under control.

DETAILED DESCRIPTION OF THE PREFERRED EMBODIMENT(S)

The present invention is applied to a belt-driven continuously variable transmission in which a belt is applied to a pair of pulleys, and a speed ratio thereof is changed continuously by changing belt grooves of the pulleys. That is, torque is frictionally transmitted between the belt and the pulleys. In the belt-driven continuously variable transmission of this kind, belt clamping pressure of the pulleys are controlled hydraulically to achieve a desired speed ratio and a torque transmitting capacity. To this end, those pulleys are individually provided with a hydraulic chamber, and the hydraulic control system according to the present invention is configured to deliver and discharge pressurized oil to/from the hydraulic chambers.

Figure 8:
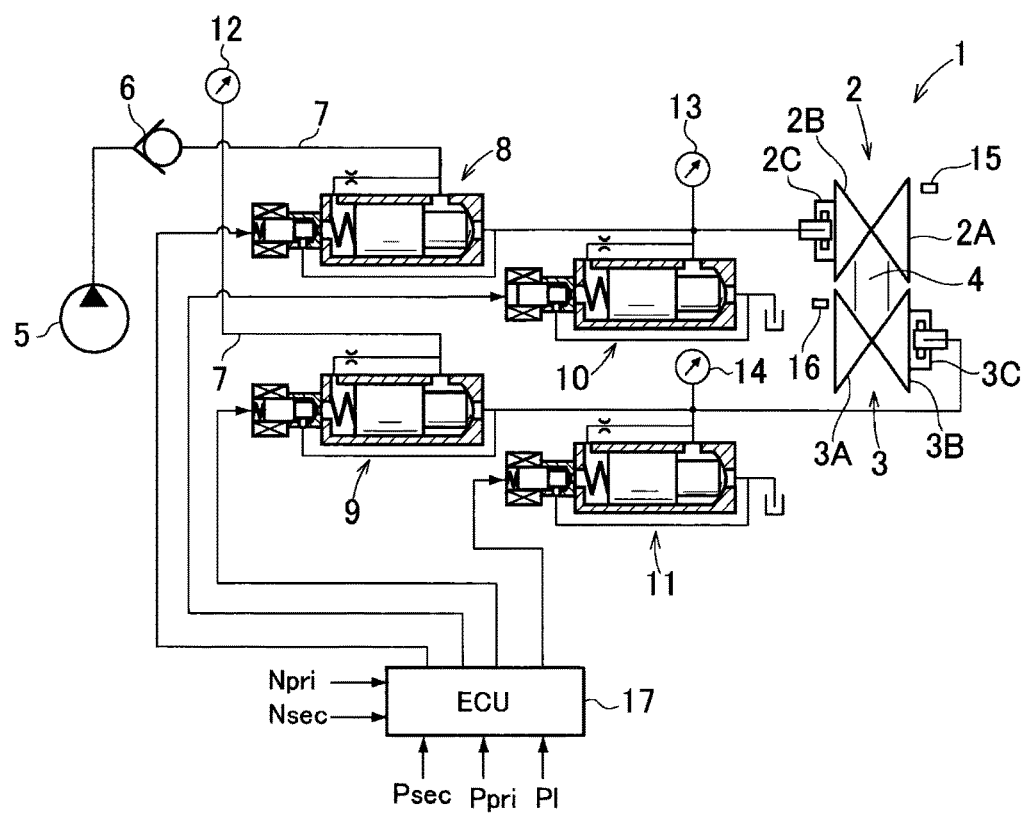
FIG. 8 is a schematic diagram showing the belt-driven continuously variable transmission and the hydraulic circuit to which the hydraulic control system of the present invention is applied.

Referring now to FIG. 8, there is shown one example of the belt-driven continuously variable transmission and a hydraulic circuit. The belt-driven continuously variable transmission 1 shown therein comprises a drive pulley (i.e., a primary pulley) 2 to which torque of a prime mover (not shown) such as an engine is applied, a driven pulley (i.e., a secondary pulley) 3 delivering torque to an output member (not shown) such as an output shaft and an output gear, and a belt 4 running on those pulleys to transmit torque between those pulleys 2 and 3. Grooves of the pulleys 2 and 3 holding the belt 4 can be changed arbitrarily. Specifically, the primary pulley 2 comprises a fixed sheave 2A, and a movable sheave 2B that is allowed to reciprocate toward and away from the fixed sheave 2A by delivering or discharging oil to/from a hydraulic chamber 2C arranged on a back face of the movable sheave 2B. Likewise, the secondary pulley 3 comprises a fixed sheave 3A, and a movable sheave 3B that is allowed to reciprocate toward and away from the fixed sheave 3A by delivering or discharging oil to/from a hydraulic chamber 3C arranged on a back face of the movable sheave 3B. A torque transmitting capacity of the belt-driven continuously variable transmission 1 is controlled by controlling hydraulic pressure applied to the hydraulic chamber of one of the pulleys (e.g., to the secondary pulley 3) clamping the belt 4 between the sheaves 3A and 3B. That is, the transmitting capacity is governed by clamping pressure established in accordance with friction acting between the belt 4 and the sheaves 3A and 3B. In this case, a speed ratio of the belt-driven continuously variable transmission 1 is changed by delivering or discharging oil to/from the hydraulic chamber 2C of the other pulley (i.e., the primary pulley 2) thereby changing a groove width between the sheaves 2A and 2C to change an effective running diameter of the belt 4.

Thus, hydraulic pressures in the pulleys 2 and 3 are controlled by delivering and discharging oil to/from the pulleys 2 and 3 depending on the situation. An initial pressure for controlling the pulleys 2 and 3 is established by a hydraulic source 5 such as an oil pump and an accumulator. In case of using the oil pump as the hydraulic source 5, not only a mechanical oil pump driven by the prime mover but also an electric oil pump are usable. A feeding passage (or a line pressure passage) 7 on which a check valve 6 is disposed connects the hydraulic source 5 and the hydraulic chambers 2C and 3C. On the feeding passage 7, a feeding valve 8 is disposed on a route connected to the hydraulic chamber 2C of the primary pulley 2 so that delivery of oil to the hydraulic chamber 2C is selectively enabled by opening the feeding valve 8 depending on the situation. Also, a feeding valve 9 is disposed on a route of the feeding passage 7 connected to the hydraulic chamber 3C of the secondary pulley 2 so that delivery of oil to the hydraulic chamber 3C is selectively enabled by opening the feeding valve 9 depending on the situation. A draining valve 10 is also connected to the hydraulic chamber 2C of the primary pulley 2 so that the oil in the hydraulic chamber 2C is selectively drained to a predetermined drain site by opening the draining valve 10 according to need. Likewise, a draining valve 11 is also connected to the hydraulic chamber 3C of the secondary pulley 3 so that the oil in the hydraulic chamber 3C is selectively drained to a predetermined drain site by opening the draining valve 11 according to need.

The feeding valves 8 and 9, and the draining valves 10 and 11 are solenoid valves electrically controlled to be opened to selectively deliver and discharge the oil therethrough. Although the solenoid valve can control a flow rate of the oil flowing therethrough, the solenoid valve does not have a pressure regulating function. Therefore, the hydraulic pressure in each hydraulic chamber 2C and 3C is individually adjusted to target pressures by controlling the feeding valves 8 and 9 by a feedback method based on a difference between the target pressure and an actual pressure. In order to collect data for such feedback control, a line pressure sensor 12 for detecting a line pressure Pl as an initial pressure and transmitting a signal of detected value, a primary pressure sensor 13 for detecting a pressure Ppri in the hydraulic chamber 2C of the primary pulley 2 and transmitting a signal of detected value, and a secondary pressure sensor 14 for detecting a pressure Psec in the hydraulic chamber 3C of the secondary pulley 3 and transmitting a signal of detected value are arranged in the hydraulic circuit. The hydraulic circuit is further provided with a primary speed sensor 15 for detecting a speed Npri of the primary pulley 2 and transmitting a signal of detected value, and a secondary speed sensor 16 for detecting a speed Nsec of the secondary pulley 3 and transmitting a signal of detected value.

In order to control the feeding valves 8 and 9, and the draining valves 10 and 11, the hydraulic control system is provided with an electronic control unit (ECU) 17. The electronic control unit 17 is composed mainly of a microcomputer configured to carry out calculations based on incident data and preinstalled data, and to transmit calculation results in the form of command signals. To this end, specifically, data about the line pressure Pl, the pressure Ppri in the hydraulic chamber 2C of the primary pulley 2, the pressure Psec in the hydraulic chamber 3C of the secondary pulley 3, the speed Npri of the primary pulley 2, and the speed Nsec of the secondary pulley 3 detected by the sensors 12 to 16 respectively are sent to the electronic control unit 17.

According to the present invention, a balance-piston valve whose opening degree is controllable may be used as the feeding valves and the discharging valves arranged in the hydraulic control system. In the hydraulic shown in FIG. 8, the balance-piston valves having same structures are used as the feeding valves 8 and 9, and the draining valves 10 and 11. Structure of the balance-piston valve will be explained with reference to FIG. 9. In the following explanation about the balance-piston valve, a high pressure site of the feeding valve 8 or 9 includes the hydraulic source 5 establishing the line pressure Pl, a low pressure site of the feeding valve 8 or 9 includes the hydraulic chambers 2C and 3C, a high pressure site of the draining valve 10 or 11 includes the hydraulic chambers 2C and 3C, and a low pressure site of the draining valve 10 or 11 includes the drain site.

Figure 9:
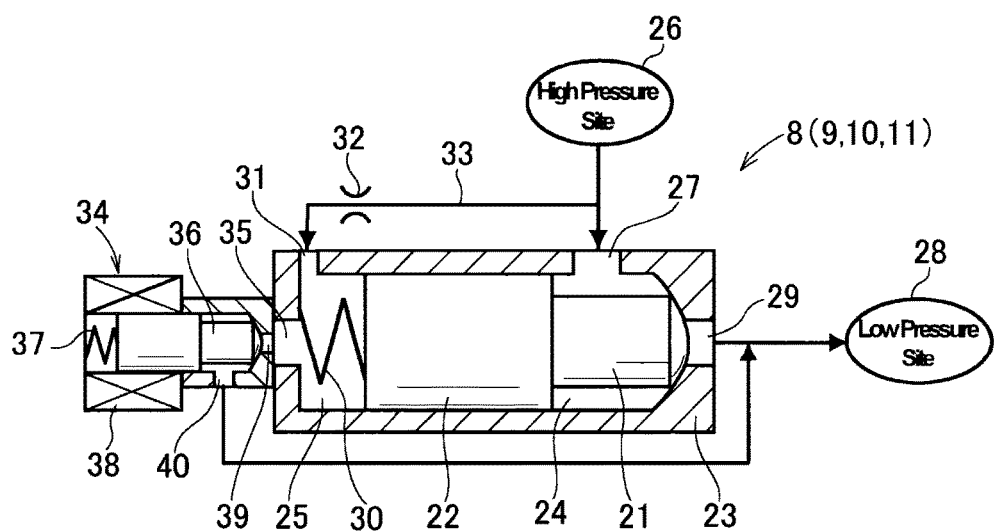
FIG. 9 is a schematic illustration showing a structure and principle of the balance piston valve used as the feeding valve and the discharging valve.

As illustrated in FIG. 9, a piston 22 integrated with a valve element 21 is held in a cylinder 23 while being allowed to reciprocate. That is, an internal space of the cylinder 23 is divided into two chambers 24 and 25 by the piston 22, and an inlet port 27 to which the oil from the high pressure site 26 is delivered and an outlet port 29 from which the oil is delivered to the low pressure site 28 are formed in the chamber 24 holding the valve element 21. Specifically, the outlet port 29 is formed on an end plate covering a leading end of the valve element 21 so that the outlet port 29 is closed by pushing the leading end of the valve element 21 thereto and opened by withdrawing the leading end of the valve element 21 therefrom. In order to push the piston 22 toward the outlet port 29, a spring 30 is arranged in the other chamber 25 created on the opposite side of the chamber 24 across the piston 22. In addition, a signal pressure port 31 is formed in the other chamber 25. The signal pressure port 31 is connected to the inlet port 27 through a communication passage 33 on which a control orifice 32 is formed. The control orifice 32 is adapted to restrict a flow rate of the oil flowing from the high pressure site 26 or the chamber 24 toward the other chamber 25. To this end, specifically, the control orifice 32 is formed by transversely arranging a thin plate having a diametrically small hole in the communication passage 33. In order to provide a connection between the chambers 24 and 25, the communication passage 33 may also be formed by penetrating through the piston 22 in an axial direction, or may also be formed on an inner face of the cylinder 23.

In order to selectively provide a communication between the chamber 25 in which the spring 30 is arranged and the low pressure site 28, the chamber 25 is provided with a solenoid valve 34. Specifically, an outlet port 35 is formed on the chamber 25, and a solenoid valve 34 is connected to the outlet port 35. To this end, the solenoid valve 34 is provided with a spring 37 pushing a valve element 36 as a shaft member in the axial direction, and an electromagnetic coil 38 adapted to establish an electromagnetic force for withdrawing the valve element 36 in the axial direction against the spring 37. In addition, an inlet port 39 connected to the outlet port 35 is formed on a leading end side of the valve element 36. That is, an opening end of the inlet port 39 serves as a valve seat so that the inlet port 39 is closed by pushing the leading end of the valve element 36 onto the opening end, and opened by withdrawing the valve element 36 from the opening end. An opening degree of the inlet port 39 may be controlled in accordance with a current applied to the electromagnetic coil 38. In order to provide a communication between a space holding the valve element 36 and the low pressure site 28, an outlet port 40 is formed on an outer wall covering the valve element 36.

Here will be explained an action of the balance-piston valve thus structured. First of all, an axial force applied to the piston 22 and the valve element 21 integrated therewith will be explained hereinafter. Force acting in the rightward in FIG. 9 is established by a hydraulic pressure Ps in the other chamber (as will be also called the "second chamber") 25 on which the signal pressure port 31 is formed. Given that an pressure receiving area of the piston 22 is As, the rightward force acting in the axial direction can be expressed as "Ps·As". By contrast, force acting in the leftward in FIG. 9 is established by the pressure Pl of the high pressure site 26 and the pressure Pr of the low pressure site 28. Accordingly, given that pressure receiving areas of those sites are Am and Ar respectively, the leftward force acting in the axial direction can be expressed as "Pl·Am·Pr·Ar". Specifically, the pressure receiving area Am receiving the pressure Pl from the high pressure site 26 can be calculated by subtracting a cross-sectional area of the valve element 21 from a cross-sectional area of the piston 22, and the pressure receiving area Ar receiving the pressure Pr from the low pressure site 28 is substantially identical to a cross-sectional area of the outlet port 29. Given that the right direction in FIG. 9 is a negative direction without talking account of an elastic force of the spring 30, an axial force applied to the piston 22 and the valve element integrated therewith can be expressed as:

$$-PS \cdot As + Pl \cdot Am + Pr \cdot Ar.$$

Specifically, the pressure Ps is lowered by opening the solenoid valve 34 by applying a current thereto so that the piston 22 is moved toward the second chamber 25. Consequently, the valve element 21 is withdrawn from the opening end of the outlet port 29 (i.e., the valve seat) to open the balance piston valve so that the oil is allowed to flow from the high pressure site 26 to the low pressure site 28.

Figure 10:
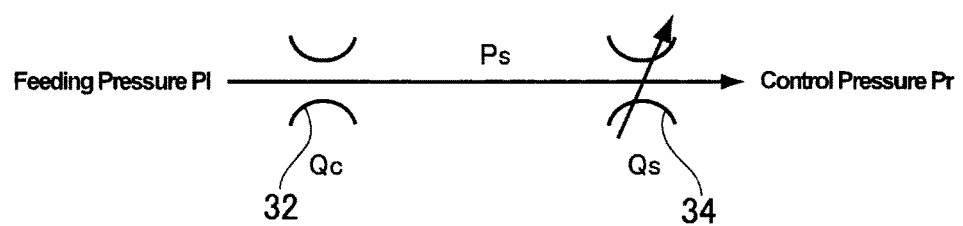
FIG. 10 is an explanatory diagram showing a relation among the control orifice, the second chamber and the control pressure.

In this situation, as schematically shown in FIG. 10, the pressure Ps in the second chamber 25 is proportional to a difference between a quantity Qc of the oil delivered from the high pressure site 26 to the second chamber 25 through the control orifice 32, and a quantity Qs of the oil discharged to the low pressure site 28 through the solenoid valve 34 (Qc−Qs). The quantity Qc of the oil thus flowing from the high pressure site 26 to the second chamber 25 is restricted by the control orifice 32. Since it is unnecessary to flow ample amount of the oil through the solenoid valve 34, a small solenoid valve is used as the solenoid valve 34. Therefore, an opening area of the inlet port 39 is rather small so that the quantity Qs of the oil flowing from the second chamber 25 to the low pressure site 28 is also restricted by the opening of the inlet port 39 (serving as an orifice).

Here will be explained a basic control of the belt-driven continuously variable transmission under a normal condition. A target speed ratio of the belt-driven continuously variable transmission is determined based on a running condition of the vehicle such as an opening degree of an accelerator and a vehicle speed, and an actual speed ratio can be calculated as a ratio of rotational speeds between the primary pulley 2 and the secondary pulley 3. A target pressure of the hydraulic chamber 2C of the primary pulley 2 is determined based on the difference between the target speed ratio and the actual speed ratio. Then, the feeding valve 8 is controlled to deliver the oil to the hydraulic chamber 2C or the discharging valve 10 is controlled to discharge the oil from the hydraulic chamber 2C, based on a pressure difference between the target pressure thus determined and an actual pressure detected by the primary pressure sensor 13. To this end, an output (i.e., a current value) is calculated based on the pressure difference and a feedback control gain. As widely known in the conventional art, the feedback control gain is determined in such a manner not to cause a control delay and a hunting. In order to control the belt clamping pressure, the hydraulic pressure in the hydraulic chamber 3C of the secondary pulley 3 is calculated based on a drive demand such as an opening degree of the accelerator. Then, the feeding valve 9 or the discharging valve 11 is controlled based on the pressure difference between the target pressure and the actual pressure detected by the secondary pressure sensor 14 to deliver the oil to the hydraulic chamber 3C or to discharge the oil from the hydraulic chamber 3C. In this situation, an output (i.e., a current value) is also calculated based on the pressure difference and a feedback control gain. As described, the feedback control gain is determined in such a manner not to cause a control delay and a hunting.

Thus, the pressures in the hydraulic chambers 2C and 3C are changed to control the speed ratio and the belt clamping pressure by opening the feeding valves 8 and 9, and the draining valves 10 and 11. In addition, the pressures in the hydraulic chambers 2C and 3C are changed by a change in a reaction force of the belt 4 widening the groove widths of the pulleys 2 and 3 resulting from a change in a tension of the belt 4 when changing the pressure in one of the hydraulic chambers 2C (or 3C). In order to control the hydraulic pressure stably even if the hydraulic pressure is changed by a plurality of factors, the hydraulic control system of the present invention is configured to carry out the flowing controls.

Figure 1:
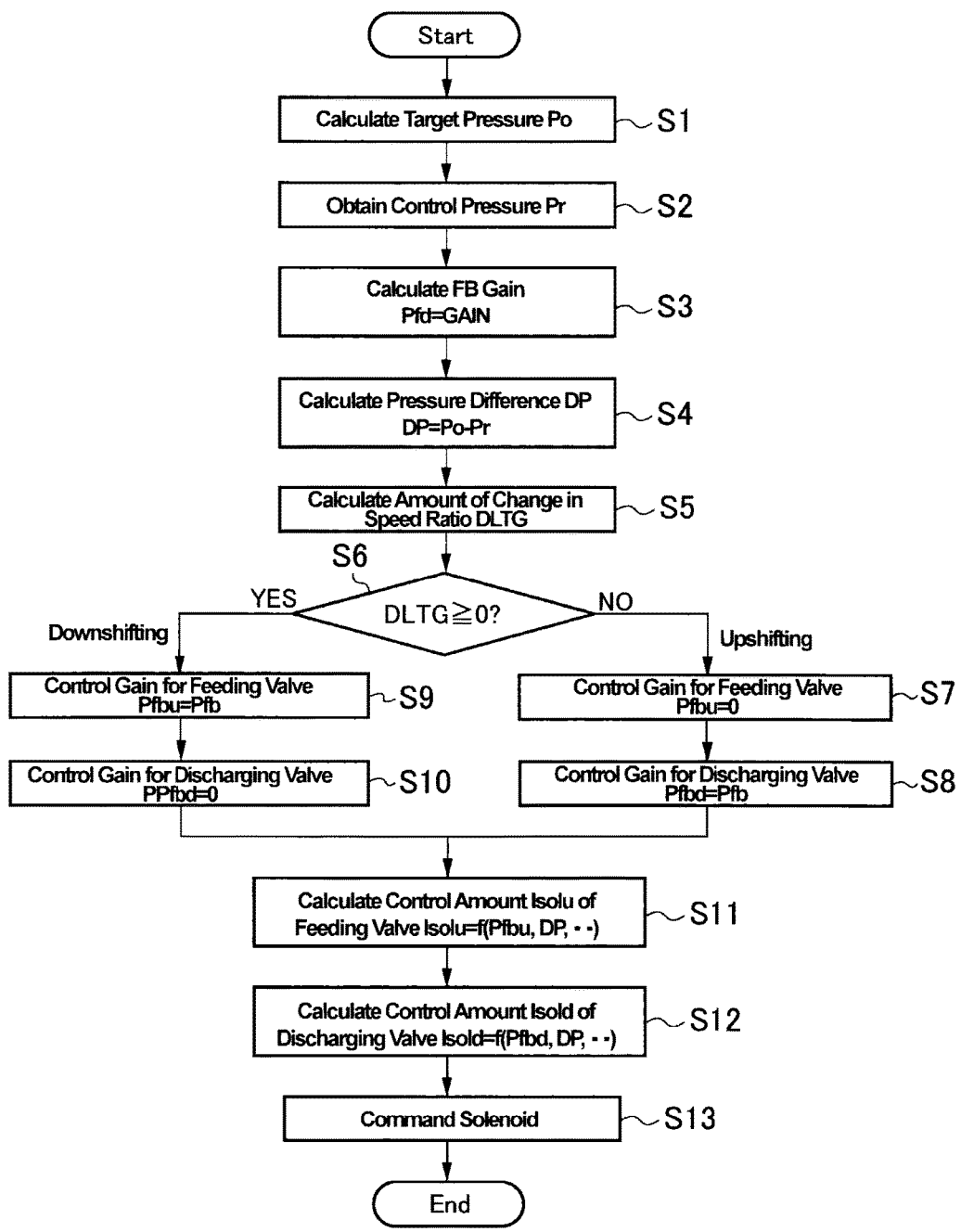
FIG. 1 is a flow chart showing one example of the control carried out by the hydraulic control system according to the present invention.

Referring now to FIG. 1, there is shown a flowchart showing one control example. The example shown therein is repeated at predetermined intervals, and configured to differentiate a control amount of the feeding valve 9 and the discharging valve 11 for the secondary pulley 3 in accordance with details of a speed change operation during execution of the feedback control of the hydraulic pressure applied to the hydraulic chamber 3C of the secondary pulley 3, from a control amount of a case in which the speed change operation is not carried out. First of all, a target pressure P0 is calculated and a control pressure Pr is obtained (at steps S1 and S2). Those calculations may be executed not only in the order shown in FIG. 1 but also in an opposite order or simultaneously. Specifically, the target pressure P0 can be calculated based on a drive demand such as an opening degree of the accelerator or a change rate thereof, and a detection value of the hydraulic pressure in the hydraulic chamber 3C of the secondary pulley by the secondary pressure sensor 14 may be used as the control pressure Pr.

Then, a control gain Pfb is calculated (at step S3). The control gain Pfb is a coefficient of a proportional term, an integral term or a derivative term used in the feedback control that is determined in such a manner not to cause a control delay and a hunting. A value GAIN of the control gain Pfb may not only be a constant value but also be a variable value taking account of another factor affecting the oil flowing through the feeding valves 8 and 9, and the draining valves 10 and 11. As described, the opening of the solenoid valve 34 of the balance-piston valve serves as an orifice when the solenoid valve 34 is opened, and for example, if a length of the opening of the solenoid valve 34 is longer than the control orifice 32, a flow resistance in the opening of the solenoid valve 34 may differ significantly from that in the control orifice 32 depending on an oil temperature. In order to correct or reduce effect of the oil temperature, the control gain Pfb may be increased with a reduction in the oil temperature if the oil temperature is lower than a predetermined level. In addition, if the pressure in the high pressure site 26 (i.e., a feeding pressure) is high, a thrust force pushing the piston 22 and the valve element 21 is increased in comparison with that of a case in which the pressure therein is low. In this case, the valves are opened easier. In order to correct or reduce effect of the feeding pressure, the control gain Pfb may also be decreased with an increment of the feeding pressure if the feeding pressure is higher than a predetermined level.

Then, a pressure difference DP between the target pressure P0 and the control pressure DP (=P0−Pr) is calculated (at step S4). That is, a difference for the feedback control of the feeding valves 8 and 9, and the draining valves 10 and 11 is calculated. In addition, an amount of change in speed ratio DLTG is calculated (at step S5). Specifically, the amount of change in speed ratio DLTG is calculated by subtracting a value of the speed ratio obtained during the previous cycle from a current value of the speed ratio. Accordingly, the amount of change in speed ratio DLTG may not only be a positive value but also be a negative value. The amount of change in speed ratio thus obtained is a change in the speed ratio during one cycle of the routine shown in FIG. 1, and hence the amount of change in speed ratio corresponds to a speed change rate. The amount of change in speed ratio DLTG may also be calculated prior to or simultaneously with calculating the control gain Pfb and the pressure difference DP.

Then, it is determined whether or not the amount of change in speed ratio DLTG calculated at step S5 is equal to or larger than "0" (at step S6). If the amount of change in speed ratio DLTG is larger than "0", this means that a downshifting is in execution to increase the speed ratio. By contrast, if the amount of change in speed ratio DLTG is smaller than "0", this means that an upshifting is in execution to decrease the speed ratio. If the upshifting is in execution so that the answer of step S6 is NO, a feedback control gain Pfbu for the feeding valve 9 connected to the hydraulic chamber 3C of the secondary pulley 3 is set to be smaller than that of a normal case in which a speed change operation is not in execution (at step S7). For example, the feedback control gain Pfbu for the feeding valve 9 is set to "0". That is, the control amount of the feeding valve 9 is reduced at step S7. To this end, the control amount of the feeding valve 9 may also be reduced by multiplying a control amount obtained based on the control gain Pfb of the normal case by a predetermined correction coefficient. Instead, the control amount of the feeding valve 9 may also be reduced by multiplying the pressure difference by a predetermined correction coefficient. In this case, the control amount should not always be reduced to "0".

Then, a feedback control gain Pfbd for the discharging valve 11 is set to a predetermined control gain Pfb for the normal condition (at step S8). In other words, a normal feedback control for the discharging valve 11 is carried out. Optionally, the control gain Pfb may be corrected taking account of the oil temperature or the feeding pressure.

By contrast, if the downshifting is in execution so that the answer of step S6 is YES, the feedback control gain Pfbu for the feeding valve 9 connected to the hydraulic chamber 3C of the secondary pulley 3 is set to the predetermined control gain Pfb for the normal condition (at step S9). In other words, a normal feedback control for the feeding valve 9 is carried out. Optionally, the control gain Pfb may also be corrected taking account of the oil temperature or the feeding pressure. Then, the feedback control gain Pfbd for the discharging valve 11 connected to the hydraulic chamber 3C of the secondary pulley 3 is set to be smaller than that of a normal case in which a speed change operation is not in execution (at step S10). For example, the feedback control gain Pfbd for the discharging valve 11 is set to "0". That is, the control amount of the discharging valve 11 is reduced at step S10. To this end, the control amount of the discharging valve 11 may also be reduced by multiplying a control amount obtained based on the control gain Pfb of the normal case by a predetermined correction coefficient. Instead, the control amount of the discharging valve 11 may also be reduced by multiplying the pressure difference by a predetermined correction coefficient. In this case, the control amount should not always be reduced to "0".

Figure 2:
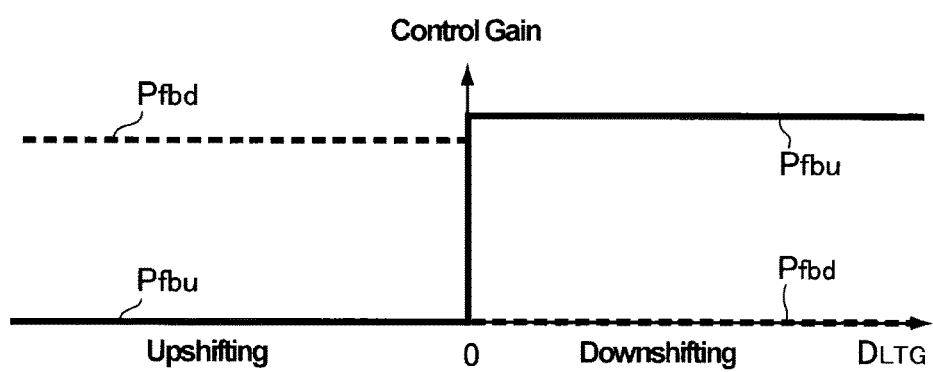
FIG. 2 is a diagram schematically showing control gains of the feeding valve and the discharging valve during upshifting and downshifting.

Such changes in the feedback control gain Pfbu for the feeding valve 9 and the feedback control gain Pfbd for the discharging valve 11 during the upshifting and the downshifting are indicated in FIG. 2. In FIG. 2, the solid line represents the feedback control gain Pfbu for the feeding valve 9, and the dashed line represents the feedback control gain Pfbd for the discharging valve 11.

Then, a control amount Isolu of the feeding valve 9 is calculated (at step S11) or a control amount Isold of the discharging valve 11 is calculated (at step S12) based on the pressure difference DP and the control gain Pfbu. Specifically, those control amounts Isolu and Isold are current outputs, and a relation between the current value and an opening degree (or an opening diameter) of the valve is governed by a structure of the valve. Such relation between the current value and the opening degree of the valve is preinstalled in the form of a relational expression or a map. At steps S11 and S12, therefore, the control amounts of the valves are calculated with reference to the preinstalled map using the control gain Pfb and the pressure difference DP as parameters. Optionally, in order to correct the control amount of the valve in such a manner to enhance control response and control stability, the feeding pressure Pl or a running mode such as a sporty mode and a normal mode may be used as a parameter to calculate the control amount of the valve, in addition to the essential parameters such as the control gain Pfb and the pressure difference DP.

Then, the control amount Isolu or Isold calculated at steps S11 or S12 are sent in the form of command signal to control opening degree of the feeding valve 9 or the discharging valve 11 (at step S13). In this situation, specifically, the solenoid valve 34 of the valance piston valve shown in FIG. 9 used as the feeding valve 9 or the discharging valve 11 is opened in response to the current applied thereto.

Specifically, during execution of upshifting, the control amount of the feeding valve 9 is reduced e.g., to "0". Consequently, even if the actual hydraulic pressure is lower than the target pressure in this situation, the oil will not be delivered to compensate such a pressure difference. During execution of upshifting, however, the belt groove in the primary pulley 2 is narrowed to increase the effective running diameter of the belt 4 and hence the belt groove in the secondary pulley 3 is widened by the belt 4. Consequently, the capacity of the hydraulic chamber 3C of the secondary pulley 3 is reduced and hence the pressure therein is raised. That is, since the oil delivery through the feeding valve 9 is thus inhibited, such pressure rise in the hydraulic chamber 3C of the second pulley 3 resulting from upshifting is not caused simultaneously with the pressure rise resulting from oil delivery through the feeding valve 9.

Then, when the actual pressure in the hydraulic chamber 3C exceeds the target pressure, the discharging valve 11 is controlled by the normal procedure so that the oil in the hydraulic chamber 3C can be discharged in a required amount. That is, the hydraulic pressure in the hydraulic chamber 3C will not be lowered excessively. In addition, the oil will not be delivered excessively to the hydraulic chamber 3C of the second pulley 3 to raise the pressure therein excessively, and when the pressure therein is higher than the target pressure, the oil is discharged in a required amount from the hydraulic chamber 3C. For these reasons, the hydraulic control can be stabilized while preventing the control hunting.

The above-explained action may also be achieved during execution of downshifting. Specifically, during execution of downshifting, the control amount of the discharging valve 11 is reduced e.g., to "0". Consequently, even if the actual hydraulic pressure is higher than the target pressure in this situation, the oil will not be discharged to compensate such a pressure difference. During execution of downshifting, however, the belt groove in the primary pulley 2 is widened to decrease the effective running diameter of the belt 4 and hence the reaction force of the belt 4 widening the belt groove in the secondary pulley 3 is reduced. Consequently, the capacity of the hydraulic chamber 3C of the secondary pulley 3 is increased and hence the pressure therein is lowered. That is, since the oil discharge through the discharging valve 11 is thus inhibited, such pressure drop in the hydraulic chamber 3C of the second pulley 3 resulting from downshifting is not caused simultaneously with the pressure drop resulting from the oil discharge through the discharging valve 11.

Then, when the actual pressure in the hydraulic chamber 3C falls below the target pressure, the feeding valve 9 is controlled by the normal procedure so that the oil is delivered to the hydraulic chamber 3C in a required amount. That is, the hydraulic pressure in the hydraulic chamber 3C will not be raised excessively. In addition, the oil will not be discharged excessively from the hydraulic chamber 3C of the second pulley 3 to lower the pressure therein excessively, and when the pressure therein is lower than the target pressure, the oil is delivered in a required amount to the hydraulic chamber 3C. For these reasons, the hydraulic control can be stabilized while preventing the control hunting.

As described, step S6 of the example shown in FIG. 1 is configured to determine the detail of the speed change operation. To this end, such determination may also be made based on other kind of data instead of the amount of change in speed ratio DLTG. For example, in the vehicle on which the belt-driven continuously variable transmission is mounted, the ECU transmits a command signal for setting a speed ratio in such a manner to adjust the engine speed to a target speed, or to adjust the engine power to archive a required driving force, when an opening degree of the accelerator or a vehicle speed is changed. Accordingly, the determination of upshifting or downshifting may also be made based on the command signal for setting the speed ratio as the example shown in FIG. 3. In the example shown in FIG. 3, the above-explained step S5 is omitted and step S6 is modified to determine a content of the command signal for setting the speed ratio (step S6-1). Remaining steps are identical to those in the control example shown in FIG. 1.

Figure 3:
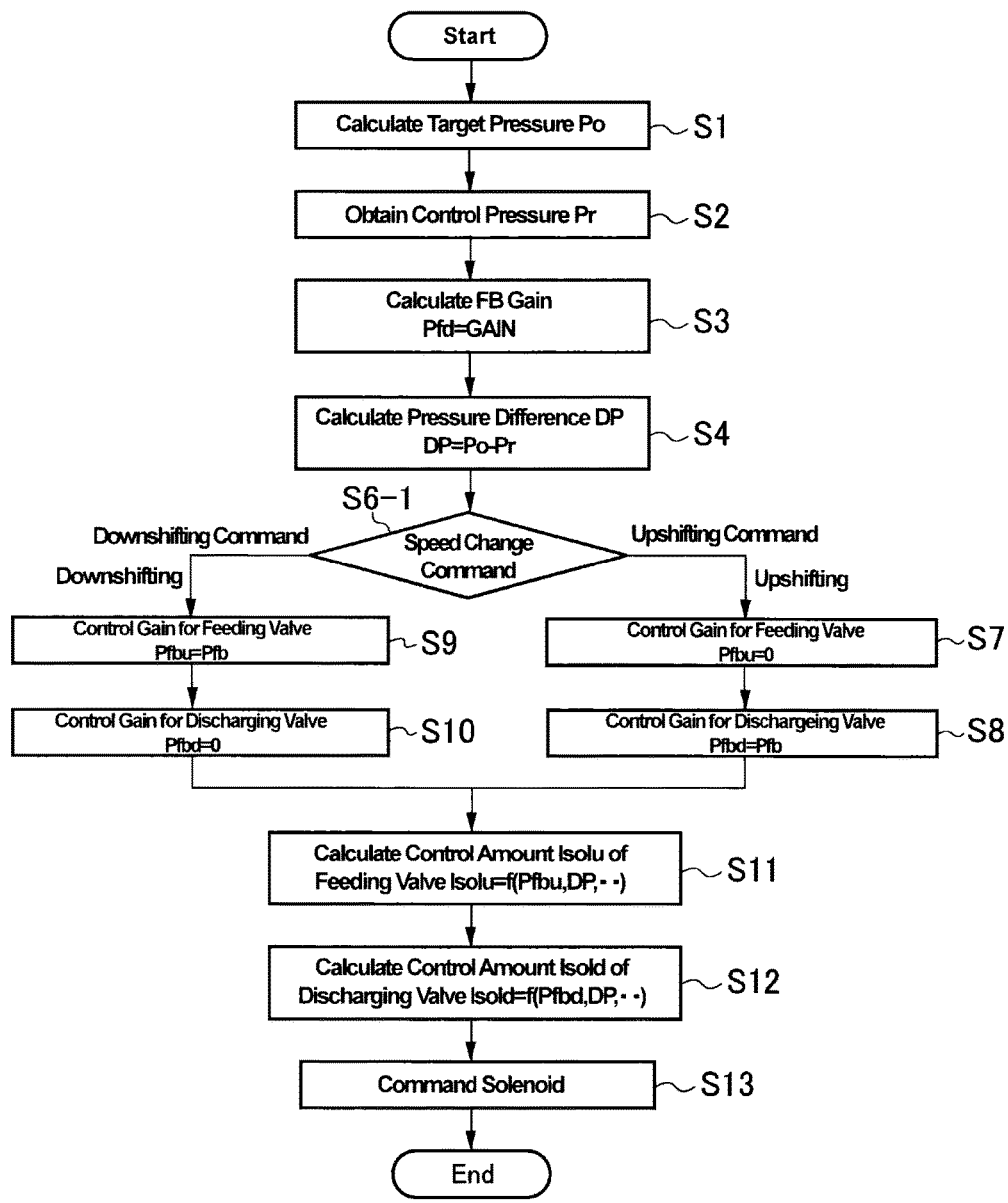
FIG. 3 is a modified example of the control shown in FIG. 1 in which a step of determining detail of a speed change operation is modified.

According to the examples shown in FIGS. 1 and 3, the control gain for the feeding valve 9 or the discharging valve 11 is reduced to be smaller than that under the normal condition or reduced to "0", even when the speed change rate is slow or even when the speed change operation is not in execution. However, in case the speed change rate is slow, change in the hydraulic pressure in the hydraulic chamber 3C of the secondary pulley 3 resulting from the speed change operation will not seriously affect the hydraulic control of the hydraulic chamber 3C of the secondary pulley 3. In this situation, therefore, it is preferable to deliver and discharge the oil to/from the hydraulic chamber 3C by the normal procedures. To this end, according to the present invention, the control for reducing the control amount or the control gain for the valve may be inhibited in case an absolute value of the speed change rate is lower than a reference speed. The example of such inhibition is shown in FIG. 4.

Figure 4:
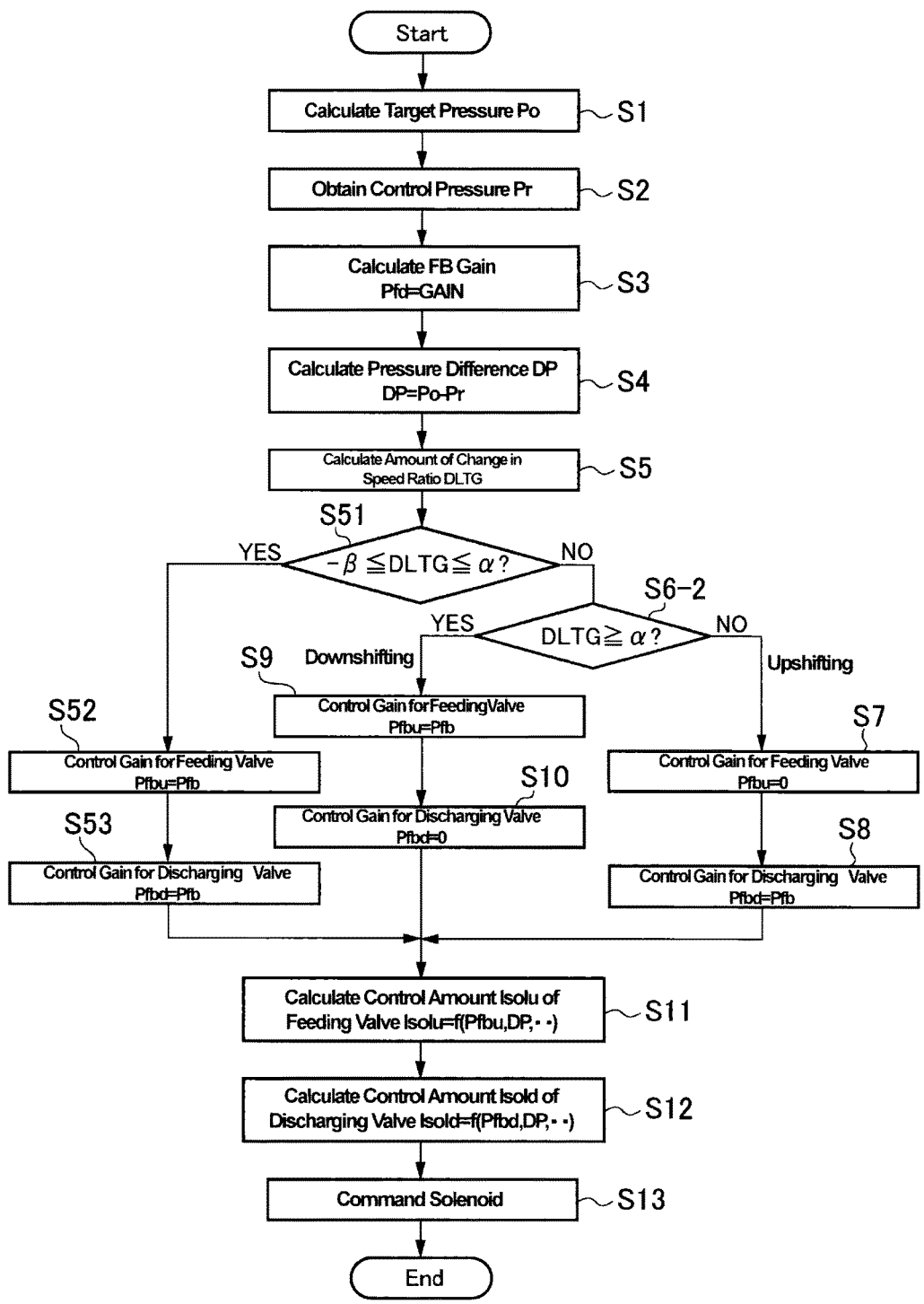
FIG. 4 is a flow chart showing another example of the control carried out by the hydraulic control system according to the present invention.

Specifically, FIG. 4 shows an example in which a step for determining whether or not the amount of change in speed ratio DLTG falls within a predetermined range, and a step for inhibiting the control for reducing the control gain are added to the routine shown in FIG. 1. In the following explanation, explanations for the steps in common with those in FIG. 1 will be omitted, and only the newly added steps to the routine shown in FIG. 1 will be explained.

After the amount of change in speed ratio DLTG is calculated at step S5, it is determined whether or not the calculated amount of change in speed ratio DLTG falls within a predetermined range (at step S51). Specifically, it is determined whether or not the calculated amount of change in speed ratio DLTG is larger than "−ß" but smaller than "+α". The lower limit value "−ß" and the upper limit value "+α" of such criterion range are determined based on experimental result in such a manner to control the hydraulic pressure in the hydraulic chamber 3C of the secondary pulley 3 as desired while preventing an excessive change in the hydraulic pressure in the hydraulic chamber 3C even during execution of the speed change operation, taking into consideration oil leakage from the hydraulic chambers 2C and 3C and the auxiliaries including the hydraulic circuit, and hydraulic stiffness therein.

If the amount of change in speed ratio DLTG falls within the criterion range so that the answer of step S51 is YES, the feedback control gain Pfbu for the feeding valve 9 and the feedback control gain Pfbd for the discharging valve 11 are individually set to the predetermined control gain Pfb of the normal case (at steps S52 and S53). Thus, if the speed ratio is being changed during the speed change operation but an amount of change in the speed ratio per unit of time is small, the control for reducing one of the control gain is inhibited to maintain the control gain to the predetermined value for the normal situation. Here, if the routine is configured to correct the control amount or the pressure difference instead of correcting the control gain, the correction of the control amount or the pressure difference is inhibited.

If the amount of change in speed ratio DLTG is out of the criterion range so that the answer of step S51 is NO, it is determined that the speed change operation in execution is upshifting or downshifting (at step S6-2). According to the example shown in FIG. 4, specifically, it is determined whether or not the amount of change in speed ratio DLTG is larger than the upper limit value "+α" of the criterion range. If the answer of step S6-2 is NO, this means that the amount of change in speed ratio DLTG is smaller than the lower limit value "−ß" of the criterion range and hence the speed change operation currently in execution can be determined as upshifting. In this case, the routine advances to steps S7 and S8 to reduce the control amount of the feeding valve 9 to be smaller than that of the normal situation (that is, the control gain Pfbu is set to "0"), and to maintain the control amount of the discharging valve 11 to the normal value (that is, the control gain Pfbd is maintained to the normal value Pfb).

By contrast, if the amount of change in speed ratio DLTG is larger than the upper limit value "+α" of the criterion range so that the answer of step S6-2 is YES, this means that the speed change operation currently in execution is downshifting. In this case, therefore, the routine advances to steps S9 and S10 to maintain the control amount of the feeding valve 9 to the normal value (that is, the control gain Pfbu is maintained to the normal value Pfb), and to reduce the control amount of the discharging valve 11 to be smaller than that of the normal situation (that is, the control gain Pfbd is set to "0").

Figure 5:
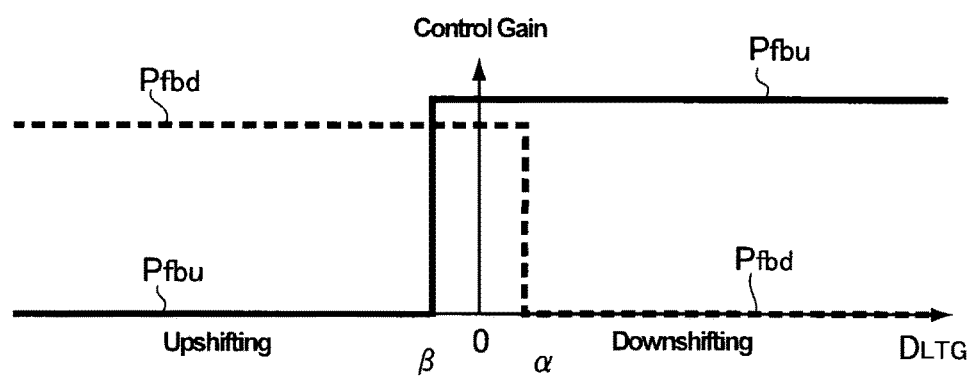
FIG. 5 is a diagram schematically showing control gains of the feeding valve and the discharging valve during upshifting and downshifting according to the example shown in FIG. 4.

Such changes in the feedback control gain Pfbu for the feeding valve 9 and the feedback control gain Pfbd for the discharging valve 11 during the upshifting and the downshifting are indicated in FIG. 5. In FIG. 5, the solid line represents the feedback control gain Pfbu for the feeding valve 9, and the dashed line represents the feedback control gain Pfbd for the discharging valve 11.

After thus setting the control gains for the feeding valve 9 and the discharging valve 11, the routine advances to steps S11 to S13 to calculate the control amount Isolu of the feeding valve 9 or the control amount Isold of the discharging valve 11 based on the pressure difference DP and the control gain Pfbu, and to transmit the calculated control amount Isolu or Isold in the form of command signal.

As described, the hydraulic pressures in the hydraulic chambers 2C and 3C of the pulleys 2 and 3 are changed not only by delivering the oil thereto or discharging the oil therefrom, but also by a change in the effective running diameter of the belt 4 or belt clamping pressure resulting from a change in an opening degree of the accelerator or a vehicle speed. An impact of such change in the running condition gets more severe with an increment of the speed change rate. Therefore, according to the example shown in FIG. 4, the control gain is set to the normal value for the situation in which the speed change operation is not executed simultaneously with the hydraulic control, in case the amount of change in speed ratio DLTG falls within the criterion range. However, since the impact of the speed change operation gets more severe with an increment of an absolute value of the speed change rate, stability of the hydraulic control may be deteriorated by the impact of the speed change operation if the speed change rate is close to the upper limit value "+α" or the lower limit value "−ß" of the criterion range of the amount of change in speed ratio DLTG. The control example shown in FIG. 6 is configured to prevent such disadvantage.

Figure 6:
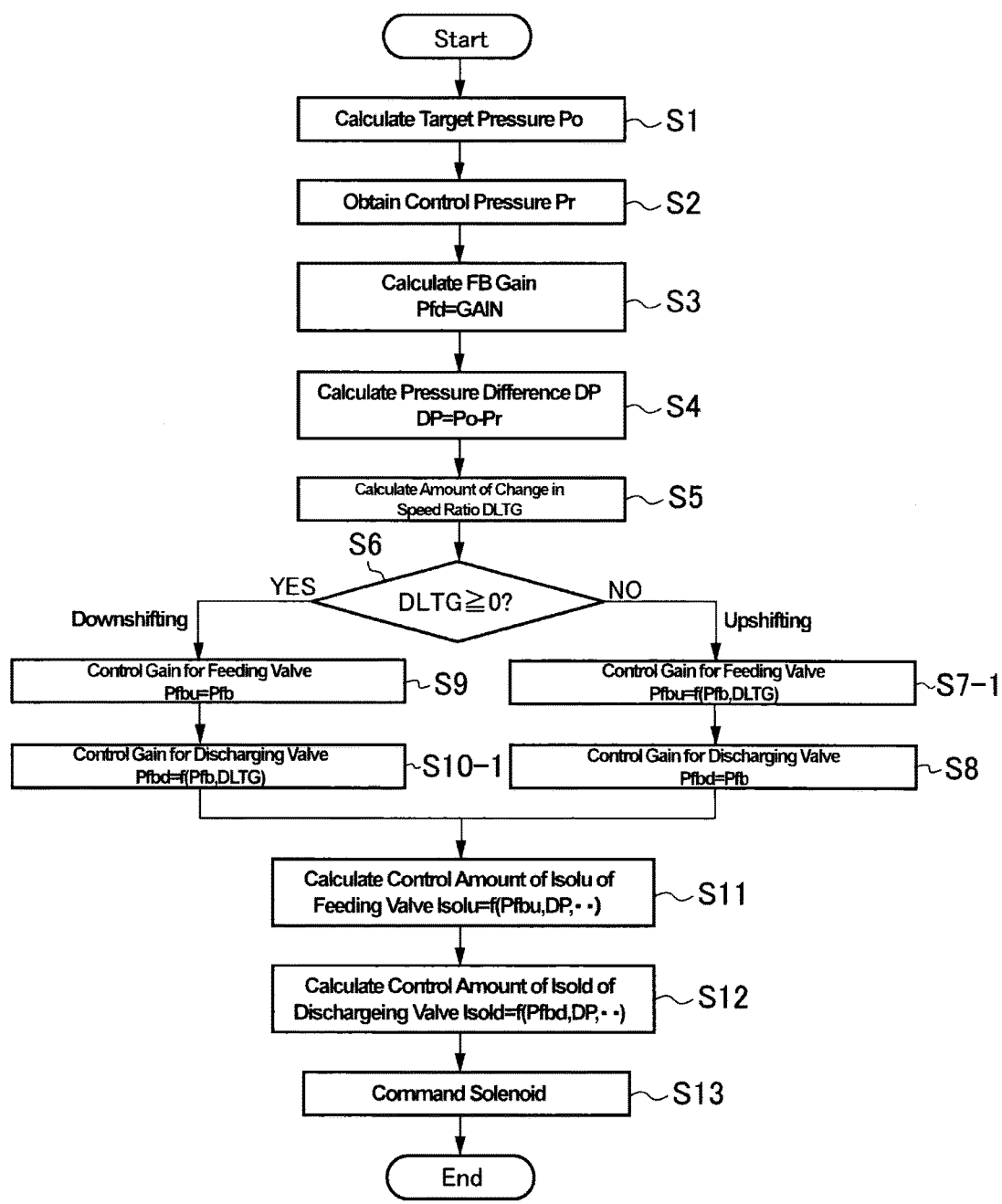
FIG. 6 is a flow chart showing still another example of the control carried out by the hydraulic control system according to the present invention.

The control example shown in FIG. 6 is configured to change the control gains Pfbu and Pfbd smoothly at a predetermined gradient in accordance with the amount of change in speed ratio DLTG or the speed change rate. According to the example shown in FIG. 1, the control gain Pfbu for the feeding valve 9 is set to "0" in the case of upshifting, and the control gain Pfbd for the discharging valve 11 is set to "0" in the case of downshifting. By contrast, according to the example shown in FIG. 4, the control gain Pfbu for the feeding valve 9 is set to a function of the amount of change in speed ratio DLTG in case of upshifting, and the control gain Pfbd for the discharging valve 11 is set to a function of the amount of change in speed ratio DLTG in case of downshifting. In the following explanation, explanations for the steps in common with those in FIG. 1 will be omitted, and only the modified steps shown in FIG. 6 will be explained.

Figure 7:
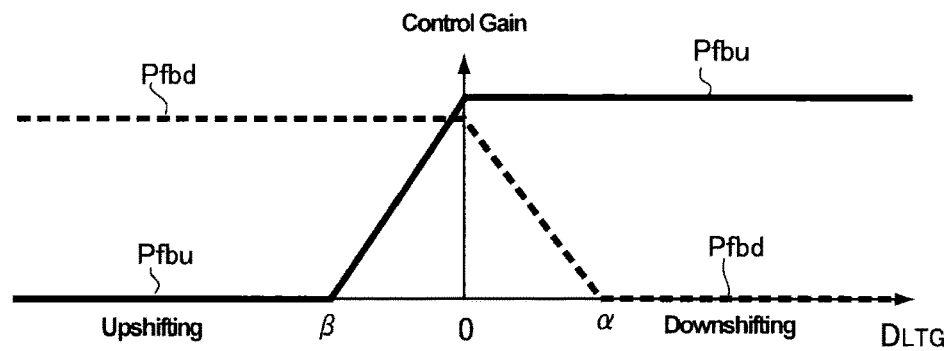
FIG. 7 is a diagram schematically showing control gains of the feeding valve and the discharging valve during upshifting and downshifting according to the example shown in FIG. 6.

As described, if the amount of change in speed ratio DLTG is smaller than "0" so that the answer of step S6 is NO, this means that upshifting is in execution. In this case, the control gain Pfbu for the feeding valve 9 is set to a value expressed as a function of at least variables of the amount of change in speed ratio DLTG and the control gain Pfb of the normal case (step S7-1). Specifically, the function is set in such a manner that the control gain Pfbu is increased gradually from "0" with an increase in the amount of change in speed ratio DLTG or the speed change rate from "0", in case the amount of change in speed ratio DLTG or the speed change rate falls between the lower limit value "−ß" of the criterion range and "0". Although FIG. 6 shows an example to increase the control gain Pfbu linearly with a change in the amount of change in speed ratio DLTG or the speed change rate, the control gain Pfbu may also be increased exponentially. In FIG. 7, the solid line represents the feedback control gain Pfbu for the feeding valve 9, and the dashed line represents the feedback control gain Pfbd for the discharging valve 11.

By contrast, if the amount of change in speed ratio DLTG is larger than "0" so that the answer of step S6 is YES, this means that downshifting is in execution. In this case, the control gain Pfbd for the discharging valve 10 is set to a value expressed as a function of at least variables of the amount of change in speed ratio DLTG and the control gain Pfb of the normal case (step S10-1). Specifically, the function is set in such a manner that the control gain Pfbd is decreased gradually toward "0" with an increase in the amount of change in speed ratio DLTG or the speed change rate from "0", in case the amount of change in speed ratio DLTG or the speed change rate falls between the upper limit value "+α" of the criterion range and "0". Although FIGS. 6 and 7 show an example to decrease the control gain Pfbd linearly with a change in the amount of change in speed ratio DLTG or the speed change rate, the control gain Pfbd may also be decreased exponentially.

Thus, according to the control example shown in FIG. 6, even if the absolute values of the upper limit value and the lower limit value of the criterion range of the amount of change in speed ratio DLTG or the speed change rate are set to relatively large value, any one of the control gains Pfbu and Pfbd is reduced to be smaller than the normal value to reduce the control amount of the valve when the speed change condition is close to the upper limit value or the lower limit value. For this reason, the hydraulic control can be carried out stably while preventing hydraulic hunting. In addition, since the control gains Pfbu and Pfbd will not be changed drastically by a change in the amount of change in speed ratio DLTG or the speed change rate, shocks and discomfort can be reduced.

Although the foregoing examples are configured to reduce the control gain or the control amount of the feeding valve 9 or the discharging valve 11 for controlling hydraulic pressure in the hydraulic chamber 3C of the secondary pulley 3 during sopped change operation, the present invention should not be limited to the forgoing examples. That is, the present invention may also be configured to reduce a control gain or a control amount of the feeding valve 8 or the discharging valve 10 for controlling hydraulic pressure in the hydraulic chamber 2C of the primary pulley 2 during changing a belt clamping pressure.

Figure 11:
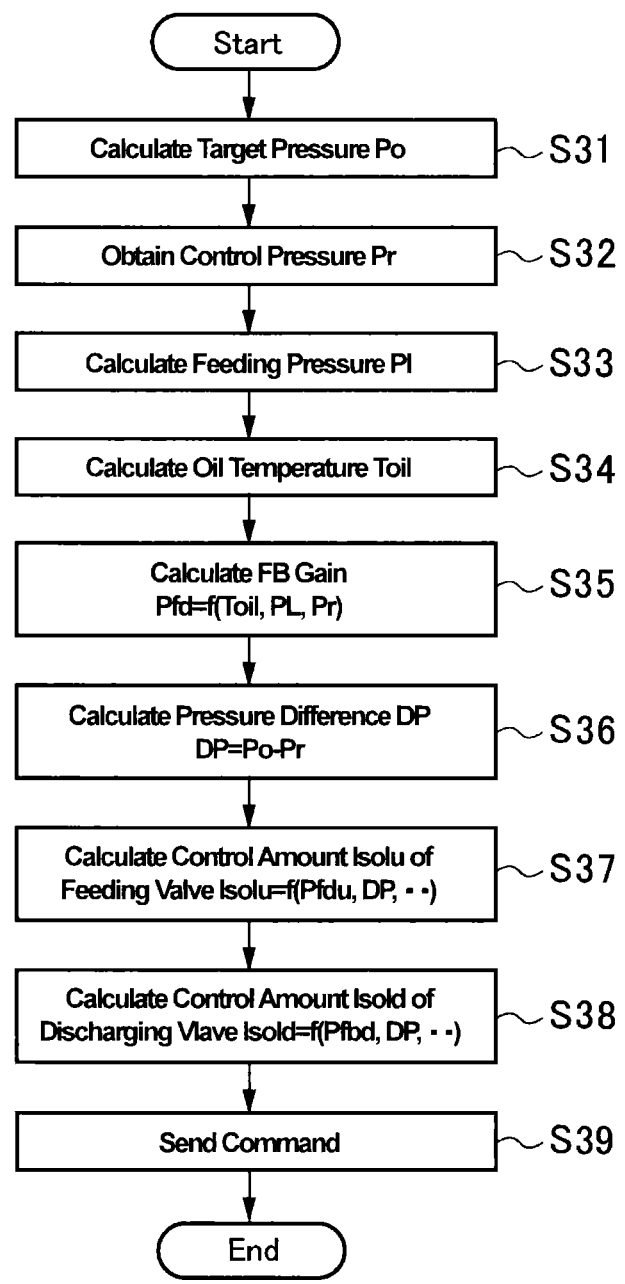
FIG. 11 is a flow chart showing an example of the control carried out by the hydraulic control system configured to reduce influence of a change in a temperature or viscosity of the oil.

By the way, viscosity of the oil used in the hydraulic control is changed depending on the temperature. According to the present invention, the hydraulic control system may also be configured to control hydraulic pressure while reducing the impact of change in an oil temperature or viscosity. Turning now to FIG. 11, there is shown a flowchart for changing a control amount of the solenoid valve 34 in accordance with an oil temperature affecting the viscosity of the oil. As described, the balance piston valve shown in FIG. 9 is used individually as the feeding valves 8 and 9, and the draining valves 10 and 11, and those valves are controlled by the feedback method in such a manner to achieve a target pressure in each hydraulic chambers 2C and 3C. For example, in case the control pressure in lower than the target pressure, the feeding valve 8 or 9 is opened to deliver the oil from the hydraulic source 5 to the hydraulic chambers 2C or 3C. By contrast, in case the control pressure in higher than the target pressure, the draining valve 10 or 11 is opened to discharge the oil from the hydraulic chambers 2C or 3C. In those cases, a control amount of the valve is determined based on a pressure difference between the target pressure and the control pressure, and a predetermined control gain.

During execution of the feedback control, the routine shown in FIG. 11 is repeated at predetermined intervals. According to the example shown in FIG. 11, first of all, a target pressure P0, a control pressure Pr, a feeding pressure Pl, and an oil temperature Toil are calculated respectively (at steps S31, S32, S33 and S34). Those calculations may be executed not only in the order shown in FIG. 11 but also in a different order or simultaneously. Specifically, the target pressure P0 is a target level of the hydraulic pressure applied to the hydraulic chamber 2C of the primary pulley 2 to achieve a target speed ratio. The target speed ratio can be calculated based on a drive demand such as an opening degree of the accelerator, a vehicle speed, and an optimum fuel curve of the prime mover. Accordingly, the target pressure P0 of the hydraulic chamber 2C of the primary pulley 2 can be calculated based on the target speed ratio, and a ratio between axial thrust forces of the primary pulley 2 and the secondary pulley 3. Meanwhile, the hydraulic pressure is also applied to the hydraulic chamber 3C of the secondary pulley 3 to establish a belt clamping pressure governing a torque transmitting capacity. Accordingly, the hydraulic pressure applied to the hydraulic chamber 3C of the secondary pulley 3 can be calculated based on a drive demand such as an opening degree of the accelerator or a change rate thereof. The control pressure Pr, the feeding pressure Pl, and the oil temperature Toil can be detected by sensors.

Figure 12:
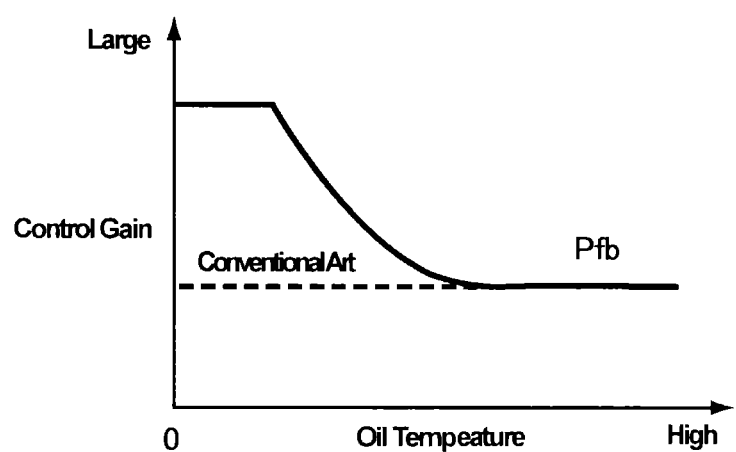
FIG. 12 is a map determining a relation between the control gain and the oil temperature.

Then, a control gain Pfb is calculated (at step S35). The control gain Pfb is a coefficient of a proportional term, an integral term or a derivative term used in the feedback control that is determined in such a manner not to cause a control delay and a hunting. According to the example shown in FIG. 11, the control gain Pfb is determined based on the oil temperature Toil, the feeding pressure Pl and the control pressure Pr. As shown in FIG. 12, in case the oil temperature Toil is lower than a predetermined level, the control gain Pfb is increased with a reduction in the oil temperature Toil. The predetermined level of the temperature is determined as a criterion at which the hydraulic control is disturbed by the viscosity of the oil if the temperature falls below the predetermined level. Such predetermined level may be determined based on an experimental result. Since the control gain Pfb is thus increased when the oil temperature is low, the oil is allowed to flow smoothly by opening the valve widely even when the viscosity of the oil is high. If the oil temperature Toil is not so low and hence the viscosity of the oil does not disturb the hydraulic control, the control gain Pfb is maintained to the current value. By contrast, if the oil temperature is low enough to increase the viscosity of the oil, the control gain Pfb is increased to the upper limit value with a reduction in the oil temperature Toil. Thus, according to this example, the control gain Pfb is increased only when the hydraulic control is disturbed by the increment of viscosity of the oil resulting from reduction in the oil temperature Toil. At this step, the control gain Pfbu for the feeding valves 8 and 9, and the control gain Pfbd for the discharging valves 10 and 11 are calculated respectively.

Then, a pressure difference DP between the target pressure P0 and the control pressure DP (=P0−Pr) is calculated (at step S36). Subsequently, a control amount Isolu is calculated for each feeding valve 8 and 9 (at step S37), or a control amount Isold of is calculated for each discharging valve 10 and 11 (at step S38) based on the pressure difference DP and the control gain Pfbu. Specifically, those control amounts Isolu and Isold are current outputs, and a relation between the current value and an opening degree (or an opening diameter) of the valve is governed by a structure of the solenoid valve 34. Such relation between the current value and the opening degree of the valve is preinstalled in the form of a relational expression or a map. At steps S37 and S38, therefore, the control amounts of the valves are calculated with reference to the preinstalled map using the control gain Pfb and the pressure difference DP as parameters. Optionally, in order to correct the control amount of the valve in such a manner to enhance control response and control stability, the feeding pressure Pl or a running mode such as a sporty mode and a normal mode may be used as a parameter to calculate the control amount of the valve, in addition to the essential parameters such as the control gain Pfb and the pressure difference DP.

Then, the control amount Isolu or Isold calculated at steps S37 or S38 are sent in the form of command signal to control opening degree of the feeding valve 8 or 9, or the discharging valve 10 or 11 (at step S39). In this situation, specifically, the solenoid valve 34 of the valance piston valve used as the feeding valve 8 or 9, or the discharging valve 10 or 11 is opened in response to the current applied thereto.

In this situation, if the oil temperature Toil is lower than the predetermined level (that is, if the oil viscosity is high), the control gain Pfb is increased in accordance with the oil temperature Toil so that the current value applied to the solenoid valve 34 is increased. Consequently, the solenoid valve 34 is opened wider in comparison with the situation in which the oil temperature is high enough so that flow resistance of the oil can be reduced even if the viscosity thereof is high. Especially, even if the oil temperature is low and hence viscosity thereof is high, the oil is allowed to flow smoothly through the control orifice 32 and the solenoid valve 34 opened widely in spite of high viscosity. In addition, even if the flow resistances increased by the increment of viscosity of the oil though the control orifice 32 and through the solenoid valve 34 differ from each other, such difference in the flow resistance can be corrected by adjusting the control amount of the feeding or discharging valve based on the oil temperature Toil. To this end, specifically, the oil is discharged from the second chamber 25 through the solenoid valve 34 as it is, while reducing the hydraulic pressure in the second chamber 25 to withdraw the valve element 21 and the piston 22 so that the oil is allowed to flow from the high pressure site 26 toward the low pressure site 28 in a desired amount. According to this example, therefore, hydraulic response can be maintained as in the normal condition even if the oil viscosity is increased by a reduction in the oil temperature Toil. For this reason, controllability of the transmission can be prevented.

Thus, according to this example, an opening degree of the solenoid valve 34 is increased when the oil temperature is low or when the oil viscosity is high, by increasing the control gain Pfb in accordance with an increase in the oil temperature. Instead, the opening degree of the solenoid valve 34 may also be increased by increasing the pressure difference DP in accordance with a reduction in the oil temperature, or by correcting a control amount calculated based on the control gain Pfb and the pressure difference DP Accordingly, the functional means carrying out the calculation at step S5 serves as the claimed control amount setting means. In addition, according to the present invention, it is not necessary to use the balance piston valve for all of the feeding valves 8 and 9 and the discharging valves 10 and 11.

In the foregoing examples, normal close valves are used in the hydraulic circuit. However, the hydraulic control system of the present invention may also be applied to the hydraulic circuit in which normal open valves are arranged. In this case, the current applied to the solenoid valve is reduced when increasing an opening degree of the solenoid valve. In any case, according to the present invention, an opening degree of the solenoid valve is increased or corrected in case the viscosity of the oil is increased by a reduction in the oil temperature, in comparison with the case in which the oil temperature is high.

According to the hydraulic control system of the present invention, therefore, the balance piston valve includes a valve controlled by a feedback method based on a difference between a target pressure and an actual pressure. In addition, the control amount setting means includes: a means that increases a feedback gain determining a control amount of the balance piston valve in case an oil temperature is low, in comparison with a case in which the oil temperature is high; a means that increases a correction amount for increasing a difference between the target pressure in the hydraulic chamber and a detected pressure in case an oil temperature is low, in comparison with a case in which the oil temperature is high; and a means that increases a correction amount for increasing the correction amount calculated based on the difference between the target pressure in the hydraulic chamber and a detected pressure in case an oil temperature is low, in comparison with a case in which the oil temperature is high. According to another aspect of the hydraulic control system of the present invention, the balance piston valve also includes a valve controlled by a feedback method based on a difference between a target pressure and an actual pressure. In addition, according to another aspect of the hydraulic control system, the control amount setting means includes: a means that increases a feedback gain determining a control amount of the balance piston valve in case an oil temperature is low, in comparison with a case in which the oil temperature is high; a means that increases a correction amount for increasing a difference between the target pressure in the hydraulic chamber and a detected pressure in case an oil temperature is low, in comparison with a case in which the oil temperature is high; and a means that increases a correction amount for reducing the correction amount calculated based on the difference between the target pressure in the hydraulic chamber and a detected pressure in case an oil temperature is low, in comparison with a case in which the oil temperature is high.

According to the present invention, an effect of a change in viscosity of the oil can be reduced by a structure of the valve as explained hereinafter. In the following explanation about the balance-piston valve, the high pressure site of the feeding valve 8 or 9 includes the hydraulic source 5 establishing the line pressure Pl, the low pressure site of the feeding valve 8 or 9 includes the hydraulic chambers 2C and 3C, the high pressure site of the draining valve 10 or 11 includes the hydraulic chambers 2C and 3C, and the low pressure site of the draining valve 10 or 11 includes the drain site.

Figure 13:
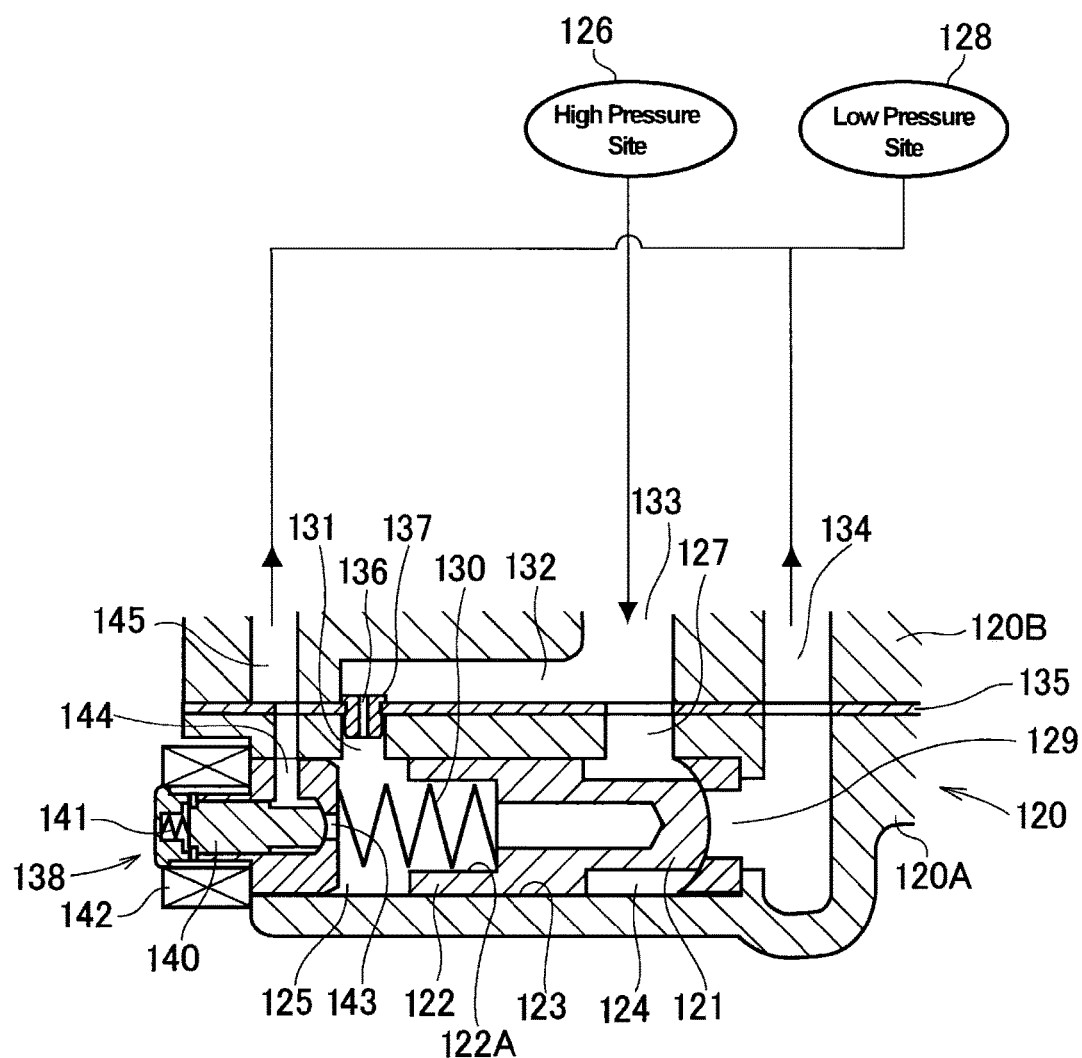
FIG. 13 is a schematic illustration showing the adjuster portion.

As illustrated in FIG. 13, a cylinder 123 is formed in a valve body 120, and a valve element 121 and a piston 122 integrated therewith are held in the cylinder 123 while being allowed to reciprocate. That is, an internal space of the cylinder 123 is divided into two chambers 124 and 125 by the piston 122, and an inlet port 127 to which the oil from a high pressure site 126 is delivered and an outlet port 129 from which the oil is delivered to a low pressure site 128 are formed in a chamber 124 holding the valve element 121. Specifically, the outlet port 129 is formed on a portion corresponding to an end plate covering a leading end of the valve element 121 so that the outlet port 129 is closed by pushing the leading end of the valve element 121 thereto and opened by withdrawing the leading end of the valve element 121 therefrom. In order to push the piston 122 toward the outlet port 129, a spring 130 is arranged in the other chamber 125 created on the opposite side of the chamber 124 across the piston 122. The piston 122 integrated with the valve element 121 has a hollow structure opening toward the other chamber 125. Specifically, a hollow space 122A in the piston 122 is diametrically larger than that in the valve element 121 so that a leading end of the spring 130 is brought into abutment against an internal step formed between the piston 122 and the valve element 121.

In addition, a signal pressure port 131 is formed in the other chamber 125, and the signal pressure port 131 is connected to the inlet port 127 through a communication passage 132. Here will be explained a structure of the communication passage 132 in more detail. The valve body 120 is comprised of a lower part 120A and an intermediate part 120B. Specifically, the cylinder 123 is formed in the lower part 120A, and the inlet port 127, the outlet port 129 and the signal pressure port 131 are formed on an upper face of the lower part 120A to provide a communication with an internal space of the intermediate part 120B joined to the lower part 120A. On the other hand, in the intermediate part 120B, a feeding passage 133 is formed to be connected to the inlet port 127 and the signal pressure port 131 through the internal space of the intermediate part 120B, and a discharging passage 134 is formed to be connected to the outlet port 129. The lower part 120A is joined liquid-tightly to the intermediate part 120B through a plate-like gasket 135 having through holes individually providing a communication between the inlet port 127 and the internal space of the intermediate part 120B, a communication between the signal pressure port 131 and the internal space of the intermediate part 120B, and a communication between the outlet port 129 and the discharging passage 134. Thus, the inlet port 127 or the feeding passage 133 is connected through the through hole to form the above-mentioned communication passage 132.

A chip 137 having a narrow oil hole 136 is fitted into the through hole providing a connection between the signal pressure port 131 and the internal space of the intermediate part 120B. That is, the oil hole 136 serves a part of the communication passage 132. Specifically, an opening area of the oil hole 136 is narrower than a cross-sectional area of a passage providing a connection between the internal space of the intermediate part 120B and the signal pressure port 131 through the through hole of the gasket 135, and a length of the oil hole 136 is longer than an opening diameter thereof. Thus, the oil hole 136 serves as an orifice for reducing a flow rate of the oil flowing therethrough so that a flow resistance of the flowing therethrough is increased with an increase in the viscosity of the oil. Accordingly, the oil hole 136 serves as the claimed adjuster portion.

In order to selectively provide a communication between the chamber 125 in which the spring 130 is arranged and the low pressure site 128, a solenoid valve 138 is connected to the chamber 125. Specifically, the solenoid valve 138 is provided with a spring 141 pushing a valve element 140 as a shaft member in the axial direction, and an electromagnetic coil 142 adapted to establish an electromagnetic force for withdrawing the valve element 140 in the axial direction against the spring 141. Here, the hydraulic control system of the present invention may also be applied to a hydraulic circuit in which normal open valves are arranged. In this case, the valve element 140 is withdrawn by an elastic force of the spring 141 to open the valve while pushing the valve element 140 by an electromagnetic force.

In addition, an inlet port 143 connected to the chamber 125 is formed on a leading end side of the valve element 140. That is, an opening end of the inlet port 143 serves as a valve seat so that the inlet port 143 is closed by pushing the leading end of the valve element 140 onto the opening end, and opened by withdrawing the valve element 140 from the opening end. An opening degree of the inlet port 143 may be controlled in accordance with a current applied to the electromagnetic coil 142. In order to provide a communication between a space holding the valve element 140 and the low pressure site 128, an outlet port 144 is formed on an outer wall covering the valve element 140. Another discharging passage 145 is formed on the intermediate part 120B to be connected to the outlet port 144 through the through hole of the gasket 135. The discharging passage 145 is also connected to the low pressure site 128.

As described, the solenoid valve 138 is closed by pushing the leading end of the valve element 140 onto the opening end of the inlet port 143 as the valve seat. In order to close the solenoid valve 138 tightly, the leading end of the valve element 140 is shaped into a curved convex projection and the valve seat is shaped into a curved concave depression to achieve a spherical contact therebetween. Specifically, when the solenoid valve 138 is energized so that the valve element 140 is withdrawn slightly from the valve seat to open the solenoid valve 138, the oil is allowed to flow through a narrow clearance thus created. That is, the clearance between the valve element 140 and the valve seat serves as an orifice to restrict the oil flow. The orifice thus created has a certain length in a flowing direction of the oil and hence a flow resistance is established when the oil viscosity is increased in accordance with an opening diameter or a cross-sectional area and a length of the orifice. The aforementioned oil hole 136 of the chip 137 is formed in such a manner that a relation between a flow rate and a temperature of the oil flowing through the solenoid valve 138 (i.e., a temperature characteristics of the oil flow) is equalized or approximated to a relation between a flow rate and a temperature of the oil flowing through the communication passage 132 (i.e., a temperature characteristics of the oil flow), when the oil temperature is low and hence the oil viscosity is high. To this end, an opening diameter and a length of the oil hole 136 are determined by measuring a flow rate of the oil flowing through the solenoid valve 138 opened with an average opening degree at a predetermined temperature, and by adjusting a flow rate of the oil flowing through the oil hole 136 under the same condition to the measured flow rate of the oil flowing through the solenoid valve 138 under the above-mentioned conditions.

In the balance piston valve thus structured, a hydraulic pressure Ps in the second chamber 125 is lowered by energizing the solenoid valve 138 to open so that the piston 122 is moved toward the second chamber 125. Consequently the valve element 121 is withdrawn from the opening end (i.e., the valve seat) of the outlet port 129 to open the balance piston valve so that the oil is allowed to flow from the high pressure site 126 toward the low pressure site 128.

In this situation, the pressure Ps in the second chamber 125 is proportional to a difference between a quantity Qc of the oil delivered from the high pressure site 26 to the second chamber 125 through the oil hole 136, and a quantity Qs of the oil discharged to the low pressure site 128 through the solenoid valve 138 (Qc–Qs). The quantity Qc of the oil thus flowing from the high pressure site 26 to the second chamber 25 is restricted by the oil hole 136. Since it is unnecessary to flow ample amount of the oil through the solenoid valve 138, a small solenoid valve is used as the solenoid valve 138. Therefore, an opening area of the inlet port 143 is rather small so that the quantity Qs of the oil flowing from the second chamber 125 to the low pressure site 128 is also restricted by the opening of the inlet port 143 (serving as an orifice).

As described, the opening diameter of the oil hole 136 is significantly smaller than the cross-sectional area of the communication passage 132 formed by the internal space of the intermediate part 120B and the gasket 135, and the length of the oil hole 136 is longer than the opening diameter thereof. In addition, characteristics of the oil hole 36 (i.e., a relation between a flow rate and a temperature of the oil) is equalized to that of the clearance between the valve element 140 and the valve seat (i.e., the orifice) in the solenoid valve 138. For this reason, a relation between a flow rate of the oil flowing through the oil hole 136 and a flow rate of the oil flowing through the solenoid valve 138 will not be changed in both situations in which the transmission is operated stably and hence the oil temperature is sufficiently high, and in which the oil temperature is still low in an initial phase of operation of the transmission and hence the oil viscosity is high. For example, when the oil temperature is still low and hence the oil viscosity is high, the flow rate of the oil flowing through the inlet port 143 of the opened solenoid valve 138 is reduced in comparison with a case in which the oil temperature is high. In addition, the flow resistance of the oil flowing through the oil hole 136 is increased in this case and hence the flow rate of the oil flowing therethrough is restricted in a same amount as a restriction amount of the oil flowing through the solenoid valve 138. For these reasons, when the oil temperature is changed, the oil flow toward the low pressure site 128 will not be slowed by a delay in a pressure drop in the second chamber 125, and the oil will not be delivered excessively to the low pressure site 128 by an excessive pressure drop in the second chamber 125 by opening the solenoid valve 138 in the hydraulic control system having the balance piston valve thus structured, therefore, the hydraulic control of the transmission can be optimized.

Thus, the adjuster portion according to this example is adapted to increase the flow resistance of the oil with an increase in the viscosity thereof by reducing the flow rate of the oil flowing toward the second chamber 125 so as to equalize the relation between the flow rate and the oil temperature to the relation therebetween of the oil flowing through the solenoid valve 138. For this purpose, the adjuster portion should not be limited to the oil hole 136 formed in the chip 137. For example, the adjuster portion may also be formed by reducing an opening diameter of the signal pressure port 131 penetrating through the cylinder 123 to be smaller than the cross-sectional area of the communication passage 132 while extending a length thereof to be longer than the opening diameter thereof. As a result of thus adjusting the opening diameter and the length of the signal pressure port 131 in a same manner as the oil hole 136, the relation between the flow rate and the temperature of the oil flowing through the communication passage 132 (i.e., a temperature characteristics of the oil flow) can be equalized or approximated to the relation between the flow rate and the temperature of the oil flowing through the solenoid valve 138 (i.e., a temperature characteristics of the oil flow).

In the example shown in FIG. 13, the hollow space 122A formed along the common center axis of the piston 122 and the valve element 121 may also serve as the communication passage, and the adjuster portion may also be formed by forming a narrow hole 121A penetrating through the outer wall of the valve element 121. In this case, specifically, the narrow hole 121A is formed to have a significantly smaller opening diameter than that of the hollow space 122A, and a longer length than the opening diameter thereof, as the case of using the oil hole 136 as the adjuster portion. In this case, the relation between the flow rate and the temperature of the oil flowing through the communication passage (i.e., a temperature characteristics of the oil flow) can be equalized or approximated to the relation between the flow rate and the temperature of the oil flowing through the solenoid valve 138 (i.e., a temperature characteristics of the oil flow).

In any of those cases, the temperature characteristics of the oil flow can be equalized or approximated in the solenoid valve 138 and the signal pressure port or the narrow hole. Therefore, even if the oil viscosity is increased by the reduction of the oil temperature, a relation between a discharging amount of the oil from the second chamber 125 when the solenoid valve 138 is opened and an amount of the oil delivered to the second chamber 125 will not be changed from such relation of the case in which the oil temperature is high. For this reason, the temperature characteristics of the feeding valves 8 and 9, and the discharging valves 10 and 11 as the balance piston valves can be stabilized so that the transmission can be controlled in a stable manner.

In case the viscosity of the oil is low, an effect of the length of the orifice restricting the flow rate of the oil is rather small. Therefore, in order to approximate the temperature characteristics of the communication passage to that of the solenoid valve 138 when the oil viscosity is increased, the adjuster portion may also be formed by forming a narrow hole on the communication passage using bimetal material deformed by heat of the oil to be opened and closed depending on the oil temperature. In addition, according to the present invention, it is not necessary to use the balance piston valve for all of the feeding valves 8 and 9 and the discharging valves 10 and 11.

Further, the solenoid valve and the balance piston valve should not be limited to the normal close valve that is normally closed and an opening degree thereof is increased with an increase in the current applied thereto. That is, a normal open valve that is normally opened and an opening degree thereof is reduced with an increase in the current applied thereto. In the foregoing examples, definition of the expression "an increase in the control amount" is to increase an opening degree of the valve, and in case of the normal open valve, this means that a reduction in the current value.

Here will be explained still another example of the hydraulic control system according to the present invention. As described, a flow rate of the oil flowing through the orifice is governed by a pressure difference between the flow rates of an upstream side and a downstream side. A hydraulic pressure in the upstream side (that is, the feeding pressure) is changed depending on an operating condition of the belt-driven continuously variable transmission and a running condition of the vehicle. Specifically, when the feeding pressure is higher than expected pressure, a flow rate of the oil flowing through the control orifice 32 is increased.

Figure 14:
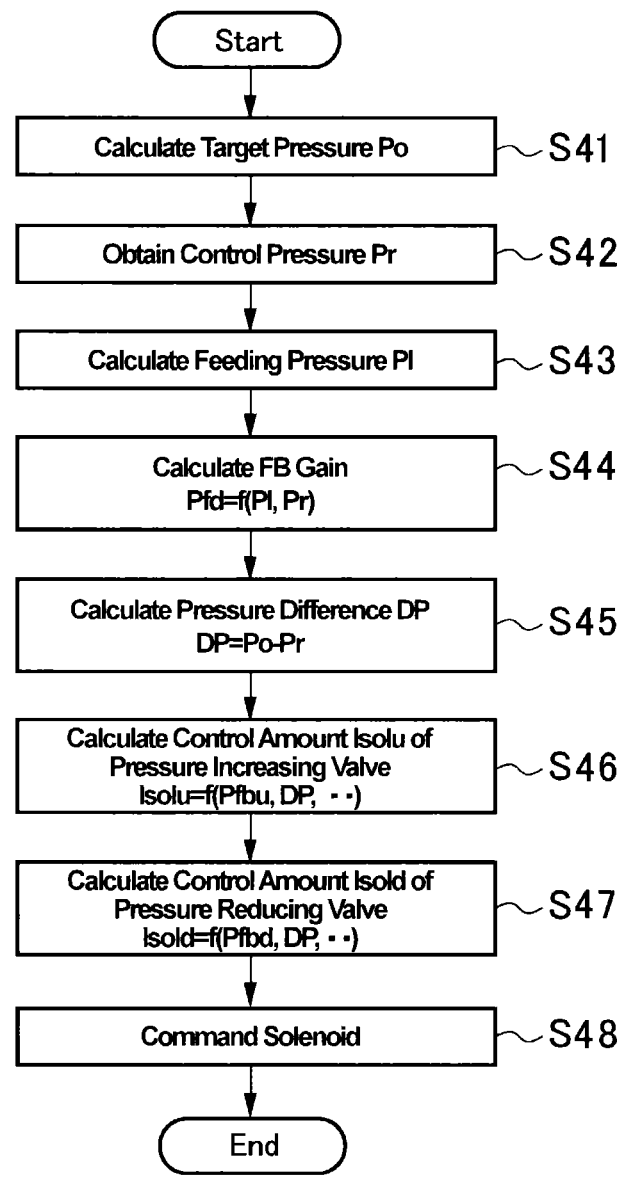
FIG. 14 is a flow chart showing an example of the control carried out by the hydraulic control system configured to reduce influence of a change in the feeding pressure to the solenoid valve.

In order to control the hydraulic pressures in the hydraulic chambers 2C and 3C in a stable manner even when the feeding pressure is fluctuated, the hydraulic control system according to the present invention is further configured to carry out the following control shown in FIG. 14. As described, the balance piston valve shown in FIG. 9 is used individually as the feeding valves 8 and 9, and the draining valves 10 and 11, and those valves are controlled by the feedback method in such a manner to achieve a target pressure in each hydraulic chambers 2C and 3C. For example, in case the control pressure in lower than the target pressure, the feeding valve 8 or 9 is opened to deliver the oil from the hydraulic source 5 to the hydraulic chambers 2C or 3C. By contrast, in case the control pressure in higher than the target pressure, the draining valve 10 or 11 is opened to discharge the oil from the hydraulic chambers 2C or 3C. In those cases, a control amount of the valve is determined based on a pressure difference between the target pressure and the control pressure, and a predetermined control gain.

During execution of the feedback control, the routine shown in FIG. 14 is repeated at predetermined intervals. According to the example shown in FIG. 11, first of all, a target pressure P0, a control pressure Pr, and a feeding pressure Pl are calculated respectively (at steps S41, S42 and S43). Those calculations may be executed not only in the order shown in FIG. 11 but also in a different order or simultaneously. Specifically, the target pressure P0 is a target level of the hydraulic pressure applied to the hydraulic chamber 2C of the primary pulley 2 to achieve a target speed ratio. The target speed ratio can be calculated based on a drive demand such as an opening degree of the accelerator, a vehicle speed, and an optimum fuel curve of the prime mover. Accordingly, the target pressure P0 of the hydraulic chamber 2C of the primary pulley 2 can be calculated based on the target speed ratio, and a ratio between axial thrust forces of the primary pulley 2 and the secondary pulley 3. Meanwhile, the hydraulic pressure is also applied to the hydraulic chamber 3C of the secondary pulley 3 to establish a belt clamping pressure governing a torque transmitting capacity. Accordingly, the hydraulic pressure applied to the hydraulic chamber 3C of the secondary pulley 3 can be calculated based on a drive demand such as an opening degree of the accelerator or a change rate thereof. The control pressure Pr and the feeding pressure Pl can be detected by the sensors.

Figure 15:
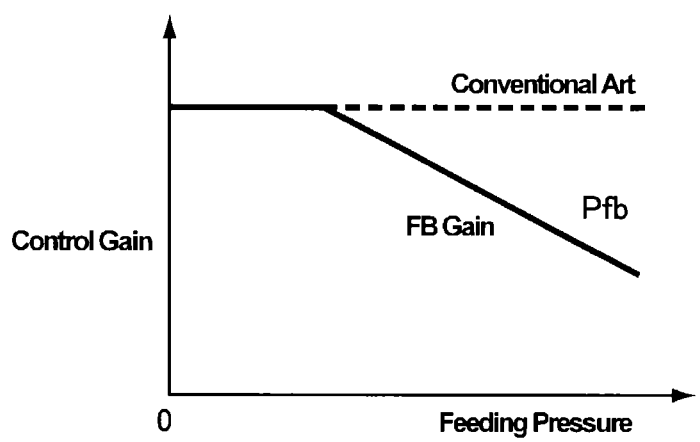
FIG. 15 is a map determining a relation between the control gain and the oil temperature used in the control shown in FIG. 14.

Then, a control gain Pfb is calculated (at step S44). The control gain Pfb is a coefficient of a proportional term, an integral term or a derivative term used in the feedback control that is determined in the form of a map in such a manner not to cause a control delay and a hunting. According to the example shown in FIG. 15, the control gain Pfb is determined based on the feeding pressure Pl and the control pressure Pr. As shown in FIG. 15, in case the feeding pressure Pl is lower than a predetermined pressure level Pth, the control gain Pfb is determined based on the feeding pressure Pl. By contrast, in case the feeding pressure Pl is higher than the pressure level Pth, the control gain Pfb is reduced with an increase in the feeding pressure Pl. Here, the predetermined pressure level Pth is an upper limit value of a frequently used pressure range. In other words, the predetermined pressure level Pth is an upper limit value of a pressure range in which the hydraulic control can be carried out without any difficulties using the normal control gain. That is, if the feeding pressure Pl exceeds the pressure level Pth, a pressure difference between the first chamber 24 and the second chamber 25 would be widened more than expected when open the solenoid valve 34 at a predetermined degree. In order to reduce the control amount of the solenoid valve 34 in such a manner to eliminate or correct such excessive pressure difference, the control gain is reduced. To this end, a reduction amount and a reduction rate of the control gain may be determined in the form of a map based on an experimental result. Optionally, the control gain may also be reduced stepwise instead of reducing continuously as shown in FIG. 15. In addition, the control gain for the discharging valve 10 or 11 may also be reduced with an increase in the hydraulic pressures therein when the hydraulic pressure therein exceeds the predetermined level.

Then, a pressure difference DP between the target pressure P0 and the control pressure DP (=P0−Pr) is calculated (at step S45). Subsequently, a control amount Isolu is calculated for each feeding valve 8 and 9 (at step S46), or a control amount Isold of is calculated for each discharging valve 10 and 11 (at step S47) based on the pressure difference DP and the control gain Pfbu. Specifically, those control amounts Isolu and Isold are current outputs, and a relation between the current value and an opening degree (or an opening diameter) of the valve is governed by a structure of the solenoid valve 34. Such relation between the current value and the opening degree of the valve is preinstalled in the form of a relational expression or a map. At steps S46 and S47, therefore, the control amounts of the valves are calculated with reference to the preinstalled map using the control gain Pfb and the pressure difference DP as parameters. Optionally, in order to correct the control amount of the valve in such a manner to enhance control response and control stability, a running mode such as a sporty mode and a normal mode may be used as a parameter to calculate the control amount of the valve, in addition to the essential parameters such as the control gain Pfb and the pressure difference DP.

Then, the control amount Isolu or Isold calculated at steps S46 or S47 are sent in the form of command signal to control opening degree of the feeding valve 8 or 9, or the discharging valve 10 or 11 (at step S48). In this situation, specifically, the solenoid valve 34 of the valance piston valve used as the feeding valve 8 or 9, or the discharging valve 10 or 11 is opened in response to the current applied thereto.

In this situation, if the feeding pressure Pl is higher than the pressure level Pth, the control gain Pfb is reduced with an increase in the feeding pressure Pl so that the feeding pressure is reduced in comparison with the situation in which the feeding pressure is low. Consequently, the opening degree of the solenoid valve 34 is reduced when the feeding pressure Pl is high. For this reason, even when the hydraulic pressure in the first chamber 24 is raised with an increase in the feeding pressure Pl, a draining amount of the oil from the second chamber 25 is reduced to prevent a reduction in the hydraulic pressure. As a result, the pressure difference between the first chamber 24 and the second chamber 25 is reduced or approximated to that of the case in which the feeding pressure Pl is lower than the pressure level Pth. Therefore, the feeding valves 8 or 9 can be prevented from being opened wider than expected degrees so that the hydraulic pressure can be controlled as desired. If the balance piston valves are used as the discharging valves 10 and 11, the above-explained advantages may also be achieved in case of discharging the oil from the hydraulic chambers 2C and 3C. According to this example, therefore, the hydraulic pressures in the hydraulic chambers 2C and 3C can be controlled without being disturbed by a pressure rise in the upstream side of the feeding valves 8 and 9, and the discharging valves 10 and 11 so that the hydraulic pressure in the transmission can be controlled in a stable manner.

Thus, when the feeding pressure from the upstream side of the valve is higher than the predetermined level, the control amount of the feeding valve or the discharging valve is reduced to reduce an opening degree of the valve to be smaller than that of the case in which the feeding pressure is lower than the predetermined level. Instead, the control amount of the valve may also be reduced by reducing a control difference (i.e., the pressure difference), or by correcting a control amount calculated based on the control difference and the control gain. In addition, according to the present invention, it is not necessary to use the balance piston valve for all of the feeding valves 8 and 9 and the discharging valves 10 and 11. Accordingly, the functional means carrying out the calculation at step S44 serves as the claimed another control amount setting means.

As described, the hydraulic control system of the present invention may also be applied to the hydraulic circuit in which normal open valves are arranged. In this case, definition of the expression "reduce the control amount" is to reduce an opening degree of the valve by increasing a current value applied to the valve.

As also described, the valance piston valve is opened and closed depending on a pressure difference across the piston. For example, when reducing the discharging amount of the oil to the low pressure site, the control valve is opened slightly to reduce the hydraulic pressure in the second chamber slightly. In this situation, the piston is pushed toward the second chamber, but the solenoid valve does not have a stopper for restricting a movement of the piston. That is, the piston keeps withdrawing and hence it is necessary to restrict such withdrawal of the piston for a predetermined period of time to keep delivering a small amount of the oil to the low pressure site. An control example of restricting a position of the piston will be explained hereinafter.

Figure 16:
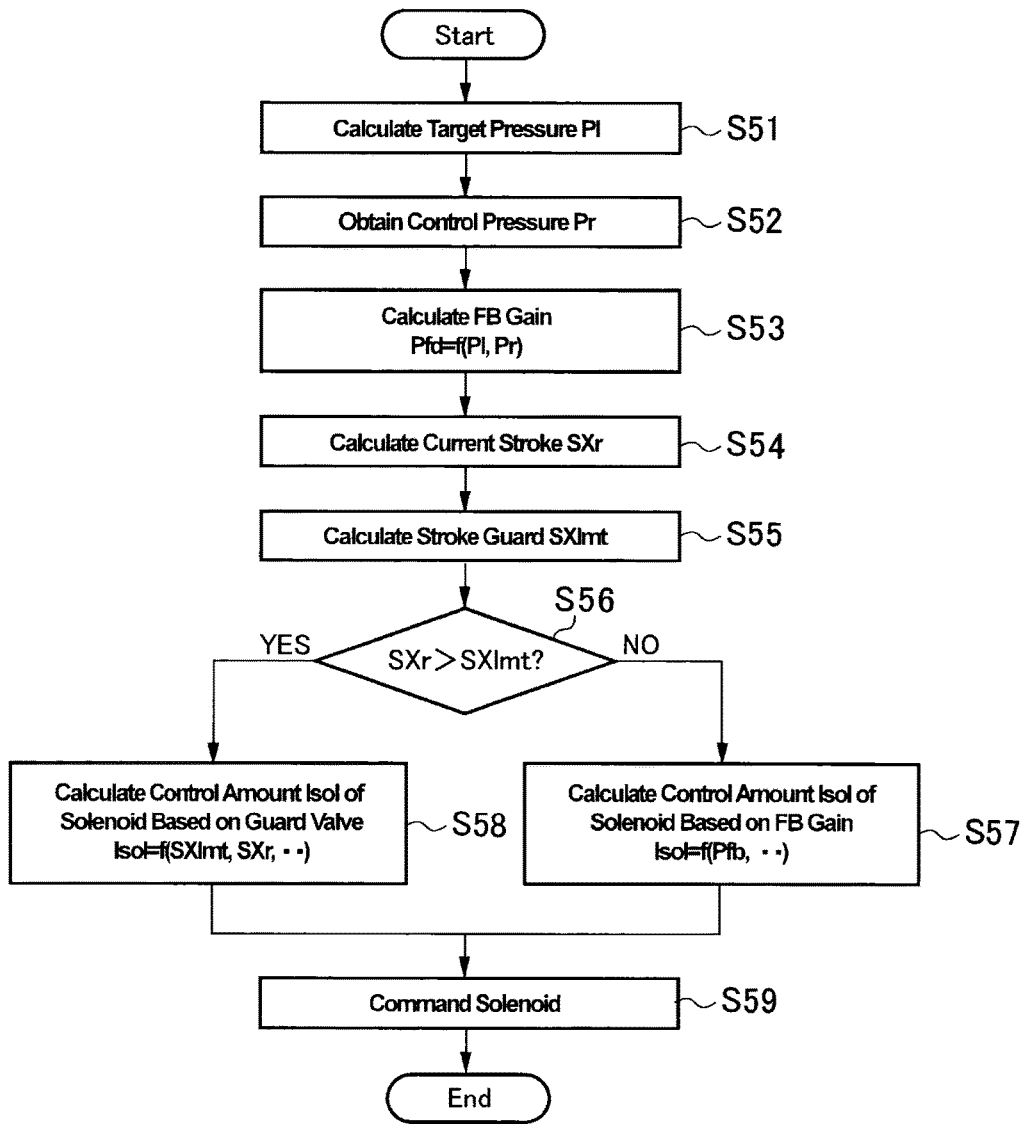
FIG. 16 is a flow chart showing an example of the control carried out by the hydraulic control system configured to restrict a stroke of the piston.

A flowchart of such restriction control is shown in FIG. 16, and the example shown in FIG. 16 is configured to control the balance piston valves shown in FIGS. 8 and 9. First of all, the feeding pressure Pl and a control pressure Pr are calculated (at steps S51 and S52). As described, the feeding pressure Pl is the pressure applied to the hydraulic chambers 2C and 3C through the feeding valves 8 and 9. That is, the feeding pressure Pl is the line pressure. Here, the feeding pressure Pl to the discharging valve 10 or 11 corresponds to the hydraulic pressure in the hydraulic chamber 2C or 3C. On the other hand, the control pressure Pr is the pressure at the site to which the oil is delivered such as the low pressure site 28. Specifically, the control pressure Pr to the feeding valve 8 or 9 corresponds to the pressure in the hydraulic chamber 2C or 3C, and the control pressure Pr to the discharging valve 10 or 11 corresponds to the pressure at the drain site. Those calculations may be executed not only in the order shown in FIG. 16 but also in an opposite order or simultaneously. In addition, the feeding pressure Pl and the control pressure Pr may also be detected by the sensors.

Then, a control gain Pfb is calculated (at step S53). The control gain Pfb is a coefficient of a proportional term, an integral term or a derivative term used in the feedback control that is determined in such a manner not to cause a control delay and a hunting. According to the example shown in FIG. 15, the control gain Pfb is determined based on the feeding pressure Pl and the control pressure Pr. The force pushing the valve element 21 in the direction to open the valve is changed in accordance with the oil amount delivered to the first chamber 24, and the pressure in the low pressure site 28 such as the hydraulic chambers 2C and 3C is changed in accordance with a difference between the feeding pressure and the control pressure. Thus, an amount of the oil flowing through the balance piston valve is changed depending on the feeding pressure Pl and the control pressure Pr. Therefore, the control gain Pfb may be determined in the form of map, and at step S53, the control gain Pfb is obtained with reference to the map.

Then, a current stroke SXr of the valve element 21 or the piston 22 integrated therewith is calculated (at step S54). For example, the current stroke SXr may be detected by a (not shown) stroke sensor attached to the balance piston valve. Alternatively, the current stroke SXr may also be calculated based on the control current and the pressures in the hydraulic chambers 2C and 3C. Details of such calculation of the current stroke SXr will be explained later.

Before or after carrying out the calculation at step S54, a stroke guard SXlmt is calculated (at step S55). To this end, an amount of the oil delivered or discharged to/from the hydraulic chamber 2C or 3C can be calculated based on a difference between the target pressure and the actual pressure, and a length of time required to allow the oil to flow in a required amount to achieve the desired control response can be determined structurally. Therefore, a flow rate per unit of time can be calculated. The flow rate of the oil and the opening degree of the balance piston valve are related to each other so that the opening degree of the valve can be calculated based on the flow rate. Then, a travel a travel distance (i.e., a stroke) of the valve element 21 can be calculated based on the opening degree of the valve thus calculated. Thus, the stroke of the valve element 21 is governed by a required amount of the oil at the control object so that the stroke of the valve element 21 can be calculated based on the difference between the target pressure and the actual pressure. At step S55, accordingly, the guard value SXlmt is set based on the above-explained relation. Specifically, the guard value SXlmt is determined by correcting the stroke thus determined based on the difference between the target pressure and the actual pressure taking account of the control response and the control stability.

Then, it is determined whether or not the stroke SXr calculated at step S54 is larger than the guard value SXlmt calculated at step S55 (at step S56). If the stroke SXr is smaller than the guard value SXlmt so that the answer of step S56 is NO, the normal control is carried out based on the control gain Pfb calculated at step S53 (at step S57). Specifically, the control amount Isol of the solenoid valve 34 (i.e., the current value applied thereto) is calculated based on the difference between the target pressure and the actual pressure, and the control gain Pfb. Alternatively, the current value may also be determined with reference to a preinstalled map.

By contrast, if the stroke SXr is larger than the guard value SXlmt so that the answer of step S56 is YES, the control amount Isol of the solenoid valve 34 (i.e., the current value applied thereto) is calculated based on the e guard value SXlmt (at step S58). As described, the valve element 21 is moved in accordance with the control amount of the solenoid valve 34 being opened. Therefore, a movement of the valve element 21 can be stopped or a velocity of the valve element 21 can be reduced by reducing the control amount of the solenoid valve 34. Such relation between the control amount and the stroke can be determined in the form of map so that the determination of the control amount of the solenoid valve 34 at step S58 may be carried out with reference to the map.

Then, the current value thus calculated at step S57 or S58 is transmitted to the solenoid valve 34 in the form of command signal (at step S59). Consequently, the valve element 21 can be prevented from being withdrawn more than the required stroke, or the moving speed of the valve element 21 in the direction to open the valve can be reduced significantly. For this reason, the oil will not flow excessively through the balance piston valve such as the feeding valves 8 and 9, or the discharging valves 10 and 11 so that the overshooting of the control can be avoided. In other words, in case of delivering or discharging a small amount of the oil to/from the hydraulic chamber 2C or 3C, the stroke of the valve element 21 can be set to a short distance in accordance with the required amount of the oil to be delivered or discharged. Therefore, the hydraulic control can be carried out in the stable manner even if the required amount of the oil to be delivered or discharged is small.

Figure 17:
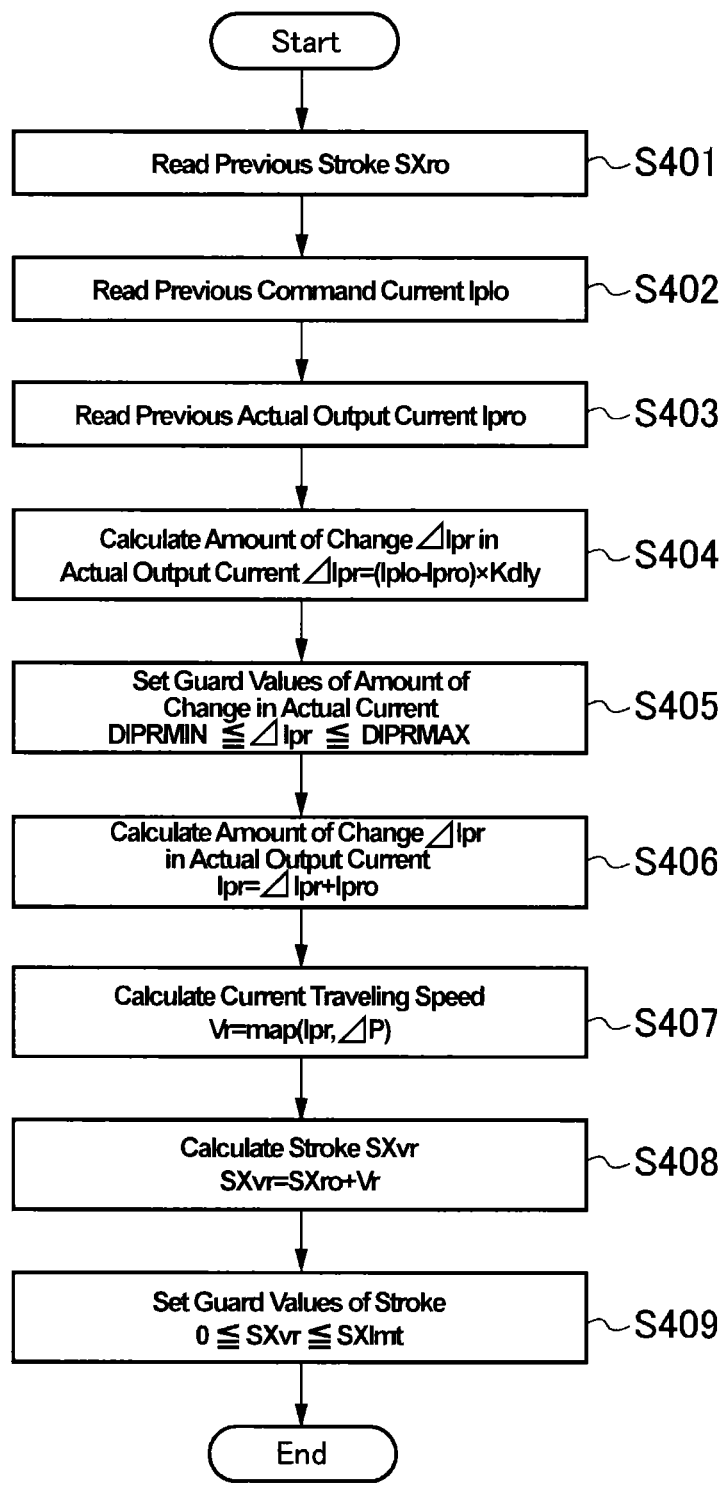
FIG. 17 is a flow chart showing an example of the control carried out by the hydraulic control system configured to calculate the stroke based on the control current.

Here will be explained the calculation of the stroke SXr at step S54. As described, the valve element 21 is moved in the direction to open the valve by applying the current to the solenoid valve 34, and the current valve and the stroke is related to each other. Accordingly, the stroke SXr can be calculated based on the current value applied to the solenoid valve 34 by the procedures shown in FIG. 17. The routine shown in FIG. 17 is also repeated at a predetermined interval. First of all, the stroke SXro during the previous cycle is read (at step S401). The routine shown in FIG. 17 is configured to calculate the stroke SXr and carried out repeatedly. That is, an initial value of the stroke SXr is "0" at step S401 of the first cycle, but the previous stroke SXr is available after subsequent cycles.

Figure 18:
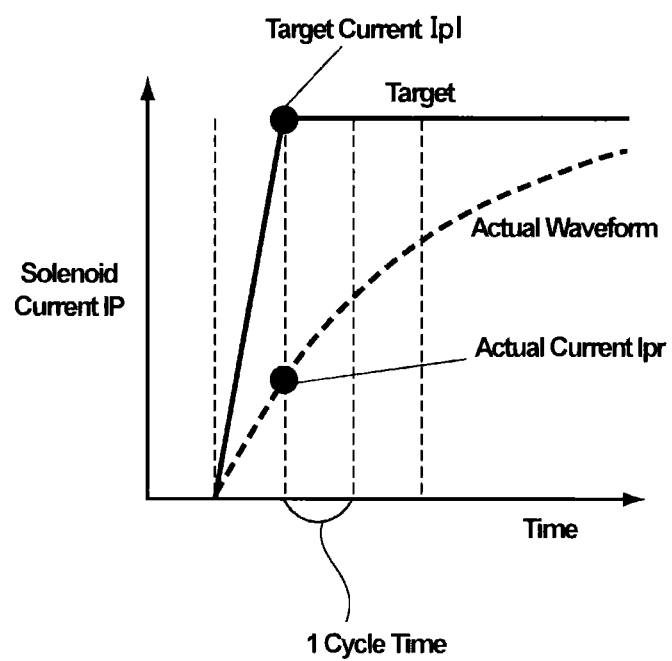
FIG. 18 is a graph schematically showing changes in the target current and the actual current according to the example shown in FIG. 17.

Then, a command current value Iplo during the previous cycle is read (at step S402). The command current value Iplo may be increased at a predetermined rate with a temporal delay. That is, the command current value Iplo is changed over time. At step S402, therefore, the command current value Iplo thus changed over time is inputted. Then, an actual output current Ipro during the previous cycle is read (at step S403). As schematically shown in FIG. 18, an increment of the current applied to the electromagnetic coil of the solenoid valve 34 is delayed by a change in magnetic flux resulting from the change in the current. Specifically, as can be seen from FIG. 18, an actual change in the current indicated by the dashed line is delayed behind a change in the target current indicated by the solid line. At step 403, the actual current thus changed is measured by an ammeter.

The calculations of steps S401 to S403 may be executed not only in the order shown in FIG. 17 but also in a desired order or simultaneously. Then, an amount of change ΔIplo of the actual current is calculated based on the command current value Iplo inputted at step S402 and the actual output current Ipro during the previous cycle inputted at step S403 (at step S404), as expressed by the following formula:

$$\Delta Ipro = (Iplo - Ipro) \cdot Kdly;$$

where Kdly is a predetermined coefficient to reduce the difference between the previous command current value Iplo and the previous actual output current Ipro within one cycle of the routine shown in FIG. 17. Consequently, the actual output current Ipro is changed in an amount of change ΔIpro within one cycle of the routine shown in FIG. 17. Then, in order to prevent the calculation value from being disturbed by disturbance, an upper limit guard value DIPRMIN and a lower limit guard value DIPRMAX of the amount of change ΔIpro are individually determined (at step S405).

Then, a current actual output current Ipr is calculated by adding the amount of change ΔIpro thus calculated to the previous value Ipro inputted at step S402 (at step S406). As described, the amount of change ΔIpro in the actual output current is calculated based on the command current value and a cycle time (i.e., a current commend time) of the routine shown in FIG. 17. That is, the actual output current Ipr is calculated based in the commend current and the command time. When the current value Ipr thus calculated is applied to the solenoid valve 34, the solenoid valve 34 is opened at a degree corresponding to the current value Ipr. Consequently, the oil is discharged from the second chamber 25 so that the pressure therein is lowered to be lower than that in the first chamber 24, and hence the valve element 21 is moved in the direction to open the valve. Therefore, a traveling speed Vr of the valve element 21 is calculated based on the current value Ipr (at step S407). If the current value Ipr is large so that the solenoid valve 34 is opened widely, pressure in the second is lowered significantly so that the traveling speed Vr of the valve element 21 is increased. In addition, the traveling speed Vr of the valve element 21 is also increased by an increase in the pressure difference 4 between the feeding pressure Pl and the control pressure Pr. Thus, the traveling speed Vr of the valve element 21 is changed in accordance with the current value Ipr and the pressure difference Δp, and such relation may be determined in the form of map based on an experimental result. Accordingly, the calculation at Step S407 may also be executed with reference to the map or data.

The traveling speed Vr thus calculated is a travel distance of the valve element 21 within one cycle of the routine shown in FIG. 17, and hence the traveling speed Vr is calculated at every cycle. Accordingly, a stroke SXvr of the valve element 21 is calculated by adding the previous stroke SXro calculated at step S401 to the traveling speed Vr corresponding to the current travel distance calculated at step S407 (at step S408). Then, an upper limit guard value and a lower limit guard value of the stroke SXvr thus calculated are determined (0≤SXvr≤SXlmt) (at step S409). As described, the traveling speed Vr is the travel distance within one cycle calculated based on the command current and the command time. Accordingly, the stroke can be calculated based on the commend current and the command time.

Thus, according to the example shown in FIG. 17, the stroke SXvr of the valve element 21 can be calculated based on the data for controlling the solenoid valve 34. For this reason, the system can be downsized or simplified by eliminating a sensing device such as a stroke sensor.

Figure 19:
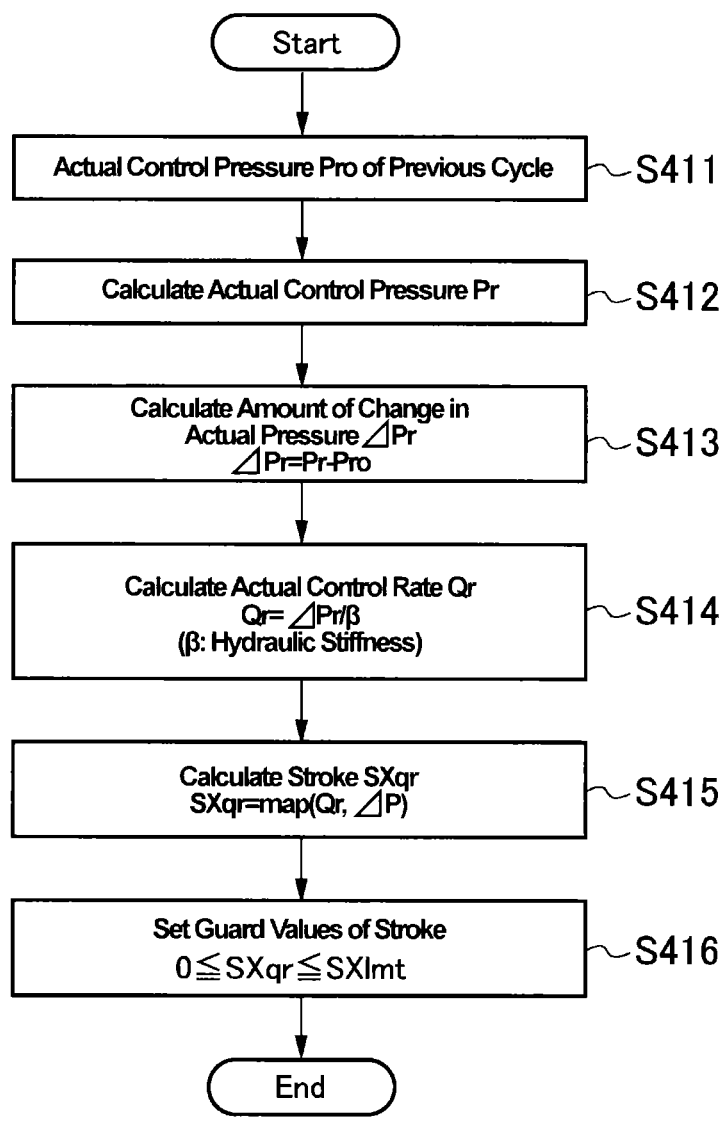
FIG. 19 is a flow chart showing an example of the control configured to calculate the stroke based on the control pressure.

Next, here will be explained an example of calculating the stroke based on the hydraulic pressure with reference to FIG. 19. The routine shown in FIG. 19 is also repeated at a predetermined interval. First of all, an actual control pressure Pro during the previous cycle and an actual current control pressure Pr are read (at steps S411 and S412). Then, a difference between the previous value and the current value of the actual pressure, that is, an amount of change Δpr in the actual pressure is calculated (at step S413). The pressure in the hydraulic chamber 2C or 3C is changed by delivering or discharging the oil thereto/therefrom in accordance with hydraulic stiffness ß governed by a structure of the hydraulic chamber 2C or 3C and specifications of the oil. That is, the delivery amount or the discharging amount of the oil can be calculated by dividing the change in the hydraulic pressure by the hydraulic stiffness. Specifically, an actual control rate Qr of the oil flow is calculated based on the amount of change Δpr in the actual pressure calculated at step S413 and the predetermined hydraulic stiffness ß (at step S414).

Figure 20:
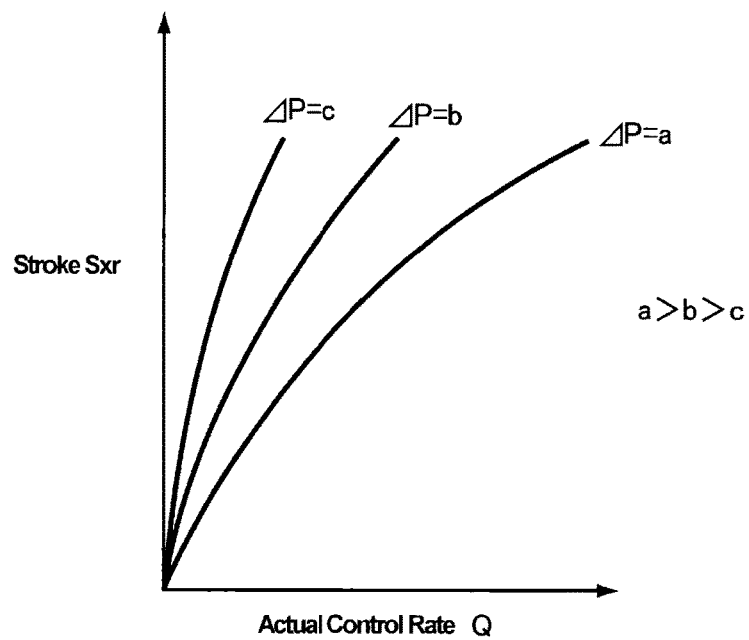
FIG. 20 is a map determining a relation among the pressure difference between the feeding pressure and the control pressure, the flow rate and the stroke.
Figure 21:
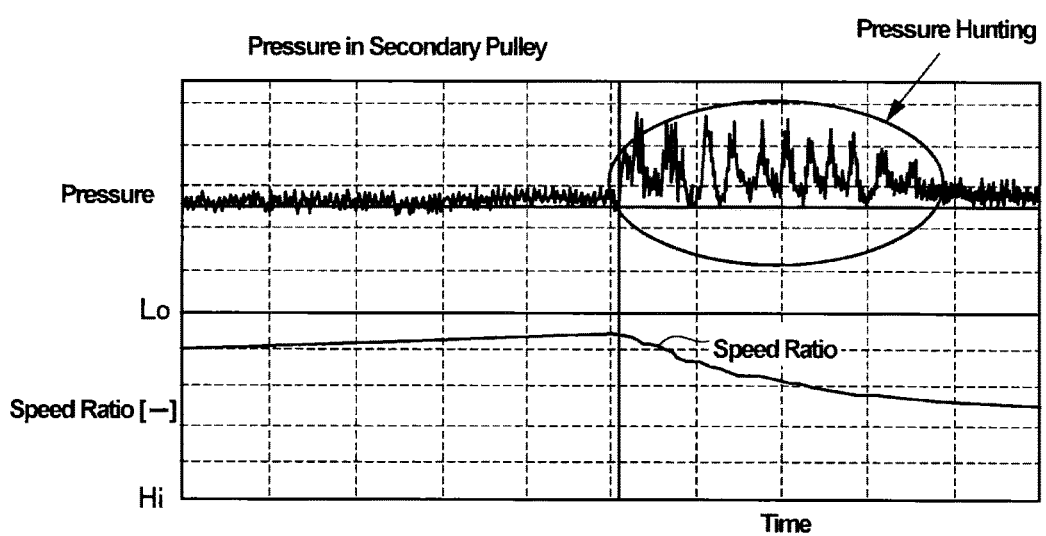
FIG. 21 is a graph showing an excessive change in the pressure in the secondary pulley during upshifting.

The flow rate Qr of the oil flowing through the balance piston valve is changed in accordance with a stroke SXqr of the valve element 21 corresponding to the opening degree thereof. A relation among Qr, SXqr and Δp can be determined based on an experimental result using an actual valve as shown in FIG. 20. As can be seen from FIG. 20, the stroke SXqr is increased to increase the actual control rate Qr, and when the above-mentioned pressure difference Δp is wide, the flow rate of the oil can be increased with a relatively small stroke SXqr. Therefore, the stroke SXqr is determined with reference to a map or data preinstalled based on the above-explained relation (at step S415). Then, as the control example shown in FIG. 17, an upper limit guard value and a lower limit guard value of the stroke SXqr thus calculated are determined (0≤SXqr≤SXlmt) (at step S416).

Thus, according to the example shown in FIG. 19, the stroke SXqr of the valve element 21 can be calculated based on the control pressure directly involved in the stroke SXqr. For this reason, the stroke SXqr can be estimated accurately. In addition, the system can be downsized or simplified by eliminating a sensing device such as a stroke sensor.

Here will be briefly explained a relation between the preferred example and the present invention. The functional means of step S5 shown in FIG. 16 serves as the claimed guard setting means, the functional means of step S8 serves as the claimed restriction means, and the functional means of steps S407 and S408 shown in FIG. 2 and the functional means of step S415 shown in FIG. 4 serve as the claimed stroke calculating means.

REFERENCE SIGNS LIST

1: belt-driven continuously variable transmission; 2: drive pulley (primary pulley); 3: driven pulley (secondary pulley); 4: belt; 2A: fixed sheave; 2B: movable sheave; 2C: hydraulic chamber; 3A: fixed sheave; 3B: movable sheave; 3C: hydraulic chamber; 5: hydraulic source; 7: feeding passage (or line pressure passage); 8: feeding valve; 9: feeding valve; 10: discharging valve; 11: discharging valve; 12: line pressure sensor; 13: primary pressure sensor; 14: secondary pressure sensor; 15: primary speed sensor; 16: secondary speed sensor; 17: electronic control unit (ECU); 21, 121: valve element; 22, 122: piston; 23, 123: cylinder; 24, 25, 124, 125: hydraulic chamber; 26, 126: high pressure site; 27, 127: inlet port; 28, 128: low pressure site; 29, 129: outlet port; 31, 131: signal pressure port; 32: orifice; 33, 132: communication passage; 34, 138: solenoid valve; 35: outlet port; 36, 140: valve element; 37, 141: spring; 38, 142: electromagnetic coil; 39, 143: inlet port; 40, 1144: outlet port; 136: oil hole; 137: chip.

The invention claimed is:

1. A hydraulic control system for a belt-driven continuously variable transmission,
   in which the belt-driven continuously variable transmission comprises a pair of pulleys, a belt running between the pulleys, and a hydraulic chamber formed on each pulley that increases a thrust force in a direction to narrow a belt groove of the respective pulley in accordance with an increase in a hydraulic pressure applied to the respective hydraulic chamber,
   wherein the pair of pulleys includes a first pulley and a second pulley and the hydraulic chamber includes a first hydraulic chamber and a second hydraulic chamber, and wherein the first hydraulic chamber is formed on the first pulley and the second hydraulic chamber is formed on the second pulley,
   in which pressure in the first hydraulic chamber is increased by delivering oil to the second hydraulic chamber, and pressure in the first hydraulic chamber is lowered by discharging the oil from the second hydraulic chamber,
   in which a feeding valve that is opened to deliver the oil to the first hydraulic chamber and a discharging valve that is opened to discharge the oil from the first hydraulic chamber are individually connected to the first hydraulic chamber, and
   in which the hydraulic control system is configured to execute a feedback control of the feeding valve and the discharging valve to adjust pressure in the first hydraulic chamber to a target level based on a pressure difference between a target pressure and an actual pressure in the first hydraulic chamber,
   wherein the hydraulic control system is configured to carry out a control to:
   reduce a feed control amount of the feeding valve connected to the first hydraulic chamber to be smaller than an upshift control amount calculated based on the pressure difference except when the pressure in the first hydraulic chamber is increased by delivering the oil to the second hydraulic chamber; and
   reduce a discharge control amount of the discharging valve connected to the first hydraulic chamber to be smaller than a downshift control amount calculated based on the pressure difference except when the pressure in the first hydraulic chamber is lowered by discharging the oil from the second hydraulic chamber.

2. The hydraulic control system for the belt-driven continuously variable transmission as claimed in claim 1, wherein the control to reduce the feed control amount and the discharge control amount includes a second control to reduce a predetermined control gain.

3. The hydraulic control system for the belt-driven continuously variable transmission as claimed in claim 2, wherein the predetermined control gain includes:
   a control gain that is increased when an oil temperature is high, to be larger than the control gain when the oil temperature is low; and
   the control gain that is increased when a feeding pressure to the feeding valve or the discharging valve is high, to be larger than the control gain when the feeding pressure is low.

4. The hydraulic control system for the belt-driven continuously variable transmission as claimed in claim 1, wherein the control to reduce the feed control amount and the discharge control amount includes a third control to reduce the upshift control amount and the downshift control amount calculated based on the pressure difference to zero.

5. The hydraulic control system for the belt-driven continuously variable transmission as claimed in claim 1,
wherein the oil is delivered to and discharged from the first hydraulic chamber to control a first belt clamping pressure, and the oil is delivered to and discharged from the second hydraulic chamber to change a speed ratio; and
wherein the hydraulic control system is further configured to inhibit the control to reduce the feed control amount of the feeding valve or the discharge control amount of the discharging valve connected to the first hydraulic chamber when an amount of change in the speed ratio within a predetermined period of time falls within a predetermined range.

6. The hydraulic control system for the belt-driven continuously variable transmission as claimed in claim 1, wherein the hydraulic control system is further configured to change the feed control amount or the discharge control amount at a predetermined rate, when reducing the feed control amount or the discharge control amount, respectively, or when increasing the feed control amount or the discharge control amount, respectively, when the respective control to reduce the feed control amount or the discharge control amount is terminated.

7. The hydraulic control system for the belt-driven continuously variable transmission as claimed in claim 1, wherein at least one of the feeding valve and the discharging valve includes a balance piston valve comprising:
a cylinder holding a piston to allow the piston to reciprocate;
a first chamber and a second chamber defined in an internal space of the cylinder by the piston;
a control orifice providing a communication between the first chamber and the second chamber;
an inlet port formed in the first chamber to provide a communication between the first chamber and a predetermined high pressure site;
an outlet port in the first chamber to provide a communication between the first chamber and a predetermined low pressure site;
a valve element integrated with the piston to open and close any of the inlet port and the outlet port; and
a solenoid valve selectively providing a communication between the second chamber and the predetermined low pressure site.

8. The hydraulic control system for the belt-driven continuously variable transmission as claimed in claim 7,
wherein the solenoid valve is adapted to change an opening degree of the solenoid valve in accordance with the feed control amount or the discharge control amount,
wherein the solenoid valve is adapted to create an orifice that is opened to increase an increment of flow resistance of the oil through the solenoid valve via an increase in oil viscosity, to be larger than an increment of flow resistance of the oil flowing through the control orifice, and
wherein the hydraulic control system is further configured to increase the feed control amount or the discharge control amount of the solenoid valve in such a manner that the opening degree of the solenoid valve when an oil temperature is at a predetermined value is increased to be larger than when the oil temperature is higher than the predetermined value.

9. The hydraulic control system for the belt-driven continuously variable transmission as claimed in claim 8,
wherein the solenoid valve includes a valve that changes the opening degree of the solenoid valve such that the opening degree is increased with an increase in the feed control amount or the discharge control amount, and
wherein the hydraulic control system is further configured to increase the feed control amount or the discharge control amount of the solenoid valve when the oil temperature is at the predetermined value, to be larger than when the oil temperature is higher than the predetermined value.

10. The hydraulic control system for the belt-driven continuously variable transmission as claimed in claim 8,
wherein the solenoid valve includes a valve that changes the opening degree of the solenoid valve such that the opening degree is reduced with an increase in the feed control amount or the discharge control amount, and
wherein the hydraulic control system is further configured to reduce the feed control amount or the discharge control amount of the solenoid valve when the oil temperature is at the predetermined value, to be smaller than when the oil temperature is higher than the predetermined value.

11. The hydraulic control system for the belt-driven continuously variable transmission as claimed in claim 7,
wherein the solenoid valve is adapted to be closed by axially pushing a solenoid valve element by an electromagnetic force onto an opening of a port connected to the second chamber, and to be opened by withdrawing the solenoid valve element from the opening of the port to create a clearance for allowing the oil to flow through the opening of the port; and
wherein an adjuster portion is formed in a communication passage so a relation between a flow rate and a temperature of the oil flowing through the communication passage is approximated to a relation between a flow rate and a temperature of the oil flowing through the opened solenoid valve between the valve element and the opening of the port.

12. The hydraulic control system for the belt-driven continuously variable transmission as claimed in claim 11, wherein the adjuster portion includes an oil hole in which an opening diameter of the oil hole is smaller than a cross-sectional area of the communication passage and a length of the oil hole is longer than the opening diameter of the communication passage.

13. The hydraulic control system for the belt-driven continuously variable transmission as claimed in claim 7,
wherein the solenoid valve is adapted to change an opening degree of the solenoid valve in accordance with the feed control amount or the discharge control amount, and
wherein the hydraulic control system is further configured to reduce the feed control amount or the discharge control amount of the solenoid valve in such a manner that the opening degree of the solenoid valve when pressure applied to the first chamber is higher than a predetermined level, to be larger than when the pressure applied to the first chamber is lower than the predetermined level.

14. The hydraulic control system for the belt-driven continuously variable transmission as claimed in claim 13, wherein the solenoid valve is controlled by the feedback control based on the pressure difference between the target pressure and the actual pressure in the first hydraulic chamber, and wherein the hydraulic control system is further configured to:

reduce a feedback control gain of the solenoid valve;

reduce the pressure difference between the target pressure and the actual pressure in the first hydraulic chamber; and correct the control amount calculated based on the difference between the target pressure and the actual pressure in the first hydraulic chamber.

15. The hydraulic control system for the belt-driven continuously variable transmission as claimed in claim 7, wherein the hydraulic control system is further configured to:

set a limit value of a stroke of the valve element in a direction to open the valve based on the pressure difference between the target pressure and the actual pressure in the first hydraulic chamber; and restrict the feed control amount or the discharge control amount of the solenoid valve to reduce the stroke of the valve element to be smaller than the limit value.

16. The hydraulic control system for the belt-driven continuously variable transmission as claimed in claim 15, wherein the valve element is adapted to move in the direction to open the valve by applying a current to the solenoid valve, and wherein the hydraulic control system is further configured to calculate the stroke of the valve element based on a command value and a command time of the current applied to the solenoid valve.

17. The hydraulic control system for the belt-driven continuously variable transmission as claimed in claim 15, wherein the hydraulic control system is further configured to:

calculate the stroke of the valve element based on an amount of change in the pressure in the first hydraulic chamber.

* * * * *